(12) United States Patent
Xiong et al.

(10) Patent No.: US 12,081,688 B2
(45) Date of Patent: Sep. 3, 2024

(54) TOUCHSCREEN DISPLAY METHOD AND ELECTRONIC DEVICE

(71) Applicant: Huawei Technologies Co., Ltd., Shenzhen (CN)

(72) Inventors: Liudong Xiong, Shenzhen (CN); Kaixin Wang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 330 days.

(21) Appl. No.: 17/622,534

(22) PCT Filed: Jun. 23, 2020

(86) PCT No.: PCT/CN2020/097599
§ 371 (c)(1),
(2) Date: Dec. 23, 2021

(87) PCT Pub. No.: WO2020/259470
PCT Pub. Date: Dec. 30, 2020

(65) Prior Publication Data
US 2022/0360654 A1    Nov. 10, 2022

(30) Foreign Application Priority Data

Jun. 24, 2019 (CN) .......................... 201910551528.0

(51) Int. Cl.
*H04M 19/04* (2006.01)
*G06F 3/04886* (2022.01)
(Continued)

(52) U.S. Cl.
CPC ...... *H04M 1/0243* (2013.01); *G06F 3/04886* (2013.01); *H04M 1/0268* (2013.01); *H04M 1/72436* (2021.01)

(58) Field of Classification Search
CPC .......... H04M 1/0243; H04M 1/72436; H04M 1/0268; G06F 3/04886
See application file for complete search history.

(56) References Cited

U.S. PATENT DOCUMENTS

2013/0088410 A1   4/2013   Hill et al.
2016/0170568 A1   6/2016   Kontkanen
(Continued)

FOREIGN PATENT DOCUMENTS

CN    105593806 A    5/2016
CN    106227488 A    12/2016
(Continued)

*Primary Examiner* — Moustapha Diaby
(74) *Attorney, Agent, or Firm* — Conley Rose, P.C.

(57) ABSTRACT

A touchscreen display method is implemented by an electronic device having a foldable touchscreen that includes a first screen, a bendable area, and a second screen. The first screen is foldable with the second screen using the bendable area. The touchscreen display method includes receiving a first operation of the user, where the first operation is a folding operation or an unfolding operation performed by the user on the foldable touchscreen. The touchscreen display method further includes obtaining status data collected by a sensor, where the status data includes an included angle between the first screen and the second screen at each moment. The touchscreen display method further includes controlling, based on the included angle between the first screen and the second screen, a display location, on the foldable touchscreen, of a message in a notification bar.

20 Claims, 18 Drawing Sheets

(51) Int. Cl.
*H04M 1/02* (2006.01)
*H04M 1/72436* (2021.01)

(56) References Cited

U.S. PATENT DOCUMENTS

| | | |
|---|---|---|
| 2017/0075640 A1 | 3/2017 | Chun et al. |
| 2017/0185289 A1 | 6/2017 | Kim et al. |
| 2018/0039408 A1 | 2/2018 | Cheong et al. |
| 2018/0129250 A1* | 5/2018 | La .......................... G09G 5/391 |

FOREIGN PATENT DOCUMENTS

| | | |
|---|---|---|
| CN | 107589836 A | 1/2018 |
| CN | 108459797 A | 8/2018 |
| CN | 108475171 A | 8/2018 |
| CN | 109407932 A | 3/2019 |
| CN | 110442288 A | 11/2019 |
| EP | 3964936 A1 | 3/2022 |
| KR | 20180116722 A | 10/2018 |
| WO | 2017116024 A1 | 7/2017 |

* cited by examiner

TOUCHSCREEN DISPLAY METHOD AND ELECTRONIC DEVICE

CROSS-REFERENCE TO RELATED APPLICATIONS

This application is a National Stage of International Patent Application No. PCT/CN2020/097599 filed on Jun. 23, 2020, which claims priority to Chinese Patent Application No. 201910551528.0 filed on Jun. 24, 2019. Both of the aforementioned applications are hereby incorporated by reference in their entireties.

TECHNICAL FIELD

This application relates to the field of terminal technologies, and in particular, to a touchscreen display method and an electronic device.

BACKGROUND

Currently, as flexible screen technologies rapidly develop, flexible foldable touchscreens have been applied to mobile phone products, so that a user may fold or unfold a screen, to meet use requirements of the user for different screen sizes. Currently, for a foldable mobile phone shown in FIG. 1, when the foldable mobile phone in a fully folded state receives a new message, the user usually needs to unfold the foldable mobile phone, to switch the foldable mobile phone from the fully folded state to a fully unfolded state, as shown in FIG. 1. Then, the user views a new message 001 displayed on a display of the mobile phone. It can be learned that when the foldable mobile phone is in a non-fully unfolded state, the user needs to unfold the mobile phone to view information. This is inconvenient for the user to view the new message in a timely manner. In addition, when the foldable mobile phone is folded frequently or folded many times, a service life of the machine is affected.

SUMMARY

This application provides a touchscreen display method and an electronic device, to provide a method that is convenient for a user to view an unread message on a foldable electronic device in a timely manner.

According to a first aspect, an embodiment of this application provides a touchscreen display method. The method is applicable to an electronic device having a foldable touchscreen, and the foldable touchscreen includes a first screen, a bendable area, and a second screen. The method includes: The electronic device receives a first operation of a user, where the first operation is a folding operation or an unfolding operation performed by the user on the foldable touchscreen; and then obtains status data collected by a sensor, where the status data includes an included angle between the first screen and the second screen at each moment. Finally, the electronic device controls, based on the included angle, a display location, on the foldable touchscreen, of a message in a notification bar.

In this embodiment of this application, by using the foregoing method, the display location of the message in the notification bar changes with a value of the included angle. This helps the user view an unread message in a timely manner, and can also reduce a quantity of folding times and decrease a folding frequency to some extent.

In a possible implementation, the foldable touchscreen is in a portrait state. When a difference between the included angle and 0 degrees is less than or equal to a first angle threshold, the electronic device controls the message in the notification bar to be displayed on an edge of a bottom of the second screen, where an included angle between the second screen and a horizontal plane is minimum, and the bottom of the second screen is far from the bendable area. When an absolute value of a difference between the included angle and 90 degrees is less than or equal to a second angle threshold, the electronic device controls the message in the notification bar to be displayed on an edge of a top of the second screen, where the top of the second screen is adjacent to the bendable area. When a difference between 180 degrees and the included angle is less than or equal to a third angle threshold, the electronic device controls the message in the notification bar to be displayed on an edge of a top of the first screen, where the top of the first screen is far from the bendable area.

In this embodiment of this application, in the portrait state, the display location of the message in the notification bar changes with the value of the included angle. This helps the user view the unread message.

In a possible implementation, the foldable touchscreen is in a landscape state. When a difference between the included angle and 0 degrees is less than or equal to a first angle threshold, the electronic device controls the message in the notification bar to be displayed on an edge of a bottom of the second screen that is on a right side, where the bottom of the second screen is far from the bendable area, and a display direction of the message in the notification bar is parallel to the bottom. When an absolute value of a difference between the included angle and 90 degrees is less than or equal to a second angle threshold, the electronic device controls the message in the notification bar to be displayed on an edge of an upper side of the second screen that is on a right side, where the upper side of the second screen is far from a horizontal plane, and a display direction of the message in the notification bar is parallel to the horizontal plane. When a difference between 180 degrees and the included angle is less than or equal to a third angle threshold, the electronic device controls the message in the notification bar to be displayed on an edge of an upper side of a large screen including the first screen and the second screen, where the upper side of the large screen is far from the ground, and a display direction of the message in the notification bar is parallel to the horizon plane.

In this embodiment of this application, the display location of the message in the notification bar changes with the value of the included angle. This helps the user view the unread message.

In a possible implementation, the foldable touchscreen is in the portrait state. When the foldable touchscreen switches from a fully folded state to a fully unfolded state, the electronic device controls the display location of the message in the notification bar to gradually move from the edge of the bottom of the second screen to the edge of the top of the first screen. When the foldable touchscreen switches from a fully unfolded state to a fully folded state, the electronic device controls the display location of the message in the notification bar to gradually move from the edge of the top of the first screen to the edge of the bottom of the second screen.

In this embodiment of this application, the display location of the message in the notification bar changes with the value of the included angle. This helps the user view the unread message.

In a possible implementation, the foldable touchscreen is in the landscape state. When the foldable touchscreen switches from a fully folded state to a fully unfolded state, the electronic device controls the display location of the message in the notification bar to gradually move from the edge of the bottom of the second screen to the edge of the upper side of the large screen including the first screen and the second screen. When the foldable touchscreen switches from a fully unfolded state to a fully folded state, the electronic device controls the display location of the message in the notification bar to gradually move from the edge of the upper side of the large screen including the first screen and the second screen to the edge of the bottom of the second screen.

In this embodiment of this application, the display location of the message in the notification bar changes with the value of the included angle. This helps the user view the unread message.

In a possible implementation, the user performs an up-down unfolding operation on the mobile phone in a fully rolled state. When the foldable touchscreen is in the portrait stale, the electronic device controls, based on a rolled status, the display location, on the rollable touchscreen, of the message in the notification bar.

When the rollable touchscreen rolled into a housing is stretched to be semi-unfolded, the electronic device controls the message in the notification bar to be displayed on an edge of a bottom of an unfolded touchscreen. When the rollable touchscreen rolled into the housing is stretched to be fully unfolded, the electronic device controls the message in the notification bar to be displayed on an edge of a top of the unfolded touchscreen.

According to a second aspect, an embodiment of this application provides an electronic device, including a sensor, a foldable touchscreen, a processor, and a memory. The foldable touchscreen includes a first screen, a bendable area, and a second screen, and the first screen is folded with the second screen by using the bendable area. The memory is configured to store one or more computer programs. When the one or more computer programs stored in the memory are executed by the processor, the electronic device is enabled to implement the method in any possible design in any one of the foregoing aspects.

According to a third aspect, an embodiment of this application further provides an apparatus. The apparatus includes modules/units for performing the method in any possible design in any one of the foregoing aspects. These modules/units may be implemented by hardware, or may be implemented by hardware by executing corresponding software.

According to a fourth aspect, an embodiment of this application further provides a computer-readable storage medium. The computer-readable storage medium includes a computer program, and when the computer program is run on an electronic device, the electronic device is enabled to perform the method in any possible design in any one of the foregoing aspects.

According to a fifth aspect, an embodiment of this application further provides a computer program product. When the computer program product runs on a terminal, an electronic device is enabled to perform the method in any possible design in any one of the foregoing aspects.

These aspects or other aspects in this application are clearer and more comprehensible in descriptions of the following embodiments.

BRIEF DESCRIPTION OF DRAWINGS

FIG. 8a to FIG. 8c-2 are a schematic diagram of an angle change trend in another unfolding scenario according to an embodiment of this application;

DETAILED DESCRIPTION OF EMBODIMENTS

The following describes the technical solutions in the embodiments of this application with reference to the accompanying drawings in the embodiments of this application, in the descriptions of the embodiments of this application, the terms "first" and "second" mentioned below are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of the embodiments of this application, unless otherwise specified, "a plurality of" means two or more than two.

In some embodiments of this application, an electronic device may be a portable device, for example, a mobile phone, a tablet computer, or a wearable device (for example, a smartwatch) having a wireless communication function. A portable terminal has a foldable touchscreen and an algorithm operation capability (capable of running a touchscreen display method provided in the embodiments of this application). An example embodiment of the portable device includes but is not limited to a portable device using iOS®, Android®, Microsoft®, or another operating system. The portable device may alternatively be another portable device provided that the another portable device has a foldable touchscreen and an algorithm operation capability (capable of running the touchscreen display method provided in the embodiments of this application). It should further be understood that, in some other embodiments of this application, the electronic device may not be a portable device, but a desktop computer having a foldable touchscreen and an algorithm operation capability (capable of running the touchscreen display method provided in the embodiments of this application).

Figure 2:
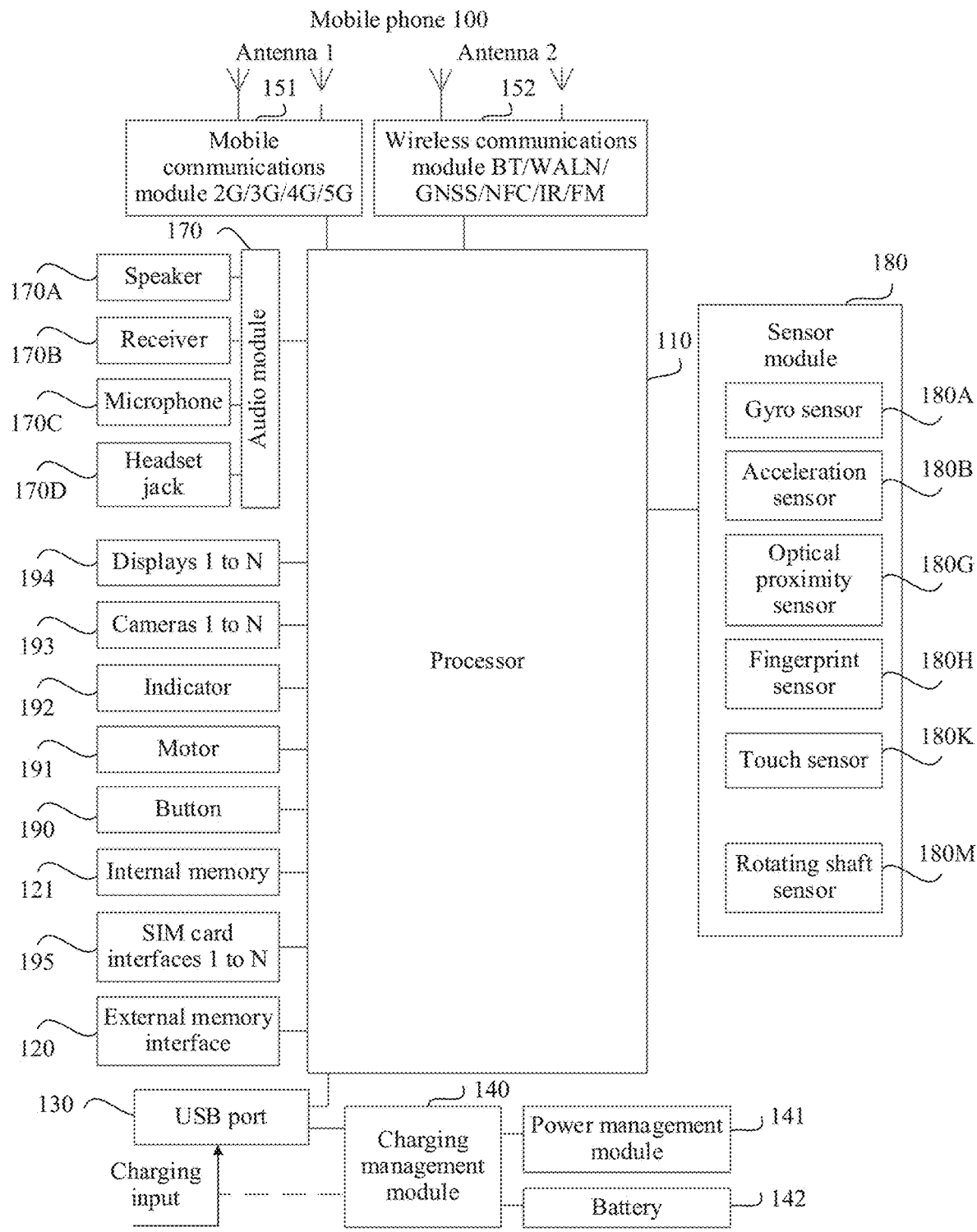
FIG. 2 is a schematic diagram of a structure of a mobile phone according to an embodiment of this application.

For example, the electronic device is a mobile phone. FIG. 2 is a schematic diagram of a structure of a mobile phone 100.

The mobile phone 100 may include a processor 110, an external memory interface 120, an internal memory 121, a USB port 130, a charging management module 140, a power management module 141, a battery 142, an antenna 1, an antenna 2, a mobile communications module 151, a wireless communications module 152, an audio module 170, a speaker 170A, a receiver 170B, a microphone 170C, a headset jack 170D, a sensor module 180, a button 190, a motor 191, an indicator 192, a camera 193, a display 194, a SIM card interface 195, and the like. The sensor module 180 may include a gyro sensor 180A, an acceleration sensor 180B, an optical proximity sensor 180G, a fingerprint sensor 180H, a touch sensor 180K, and a rotating shaft sensor 180M (where certainly, the mobile phone 100 may further include another sensor, for example, a temperature sensor, a pressure sensor, a distance sensor, a magnetic sensor, an ambient light sensor, a barometric pressure sensor, or a bone conduction sensor, which is not shown in the figure).

It may be understood that the structure shown in this embodiment of the present invention does not constitute a specific limitation on the mobile phone 100. In some other embodiments of this application, the mobile phone 100 may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (Neural-network Processing Unit, NPU), and/or the like. Different processing units may be independent components, or may be integrated into one or more processors. The controller may be a nerve center and a command center of the mobile phone 100. The controller may generate an operation control signal based on an instruction operation code and a time sequence signal, to complete control of instruction fetching and instruction execution.

A memory may further be disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor 110 may directly invoke the instructions or the data from the memory. This avoids repeated access and reduces waiting time of the processor 110. Therefore, system efficiency is improved.

The processor 110 may run computer instructions for the touchscreen display method provided in the embodiments of this application, so that a user views an unread message on the foldable electronic device in a timely manner. When different components are integrated into the processor 110 for example, a CPU and a GPU are integrated, the CPU and the GPU may cooperate to execute the instructions for the touchscreen display method provided in the embodiments of this application. For example, in the touchscreen display method, some algorithms are executed by the CPU, and the other algorithms are executed by the GPU, to obtain relatively fast processing efficiency.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), flexible light-emitting diode (flexible light-emitting diode, FLED), a mini-LED, a micro-LED, a micro-OLED, quantum dot light emitting diodes (quantum dot light emitting diodes, QLEDs), or the like. In some embodiments, the mobile phone 100 may include one or N displays 194, where N is a positive integer greater than 1.

In this embodiment of this application, the display 194 may be one integrated flexible display, or may be a spliced display including two rigid screens and one flexible screen located between the two rigid screens. After the processor 110 performs the touchscreen display method provided in the embodiments of this application, the processor 110 may control a corresponding display location, on the display 194, of a message in a notification bar.

The camera 193 (a front-facing camera, a rear-facing camera, or a camera that may serve as both a front-facing camera and a rear-facing camera) is configured to capture a static image or a video. Usually, the camera 193 may include photosensitive elements such as a lens group and an image sensor. The lens group includes a plurality of lenses (convex lenses or concave lenses), and is configured to: collect an optical signal reflected by a to-be-photographed object, and transfer the collected optical signal to the image sensor. The image sensor generates an original image of the to-be-photographed object based on the optical signal.

The internal memory 121 may be configured to store computer-executable program code. The executable program code includes instructions. The processor 110 runs the instructions stored in the internal memory 121, to perform various function applications of the mobile phone 100 and data processing. The internal memory 121 may include a program storage area and a data storage area. The program storage area may store an operating system, code of an application program (for example, a camera application or a WeChat application), and the like. The data storage area may store data (for example, an image or a video collected by the camera application) created during use of the mobile phone 100 and the like.

The internal memory 121 may further store code of a display location control algorithm provided in the embodiments of this application. When the code of the display location control algorithm stored in the internal memory 121 is run by the processor 110, the processor 110 controls the message in the notification bar to be displayed at the corresponding display location on the display 194.

In addition, the internal memory 121 may include a high-speed random access memory, and may further include a nonvolatile memory, for example, at least one magnetic disk storage device, a flash memory device, or a universal flash storage (universal flash storage, UFS).

Certainly, the code of the display location control algorithm provided in the embodiments of this application may be alternatively stored in an external memory. In this case, the processor 110 may run, through the external memory interface 120, the code of the display location control algorithm stored in the external memory, so that the processor 110 controls the message in the notification bar to be displayed at the corresponding display location on the display 194.

The following describes functions of the sensor module 180.

The gyro sensor 180A may be configured to determine a motion posture of the mobile phone 100. In some embodiments, angular velocities of the mobile phone 100 around three axes (namely, axes x, y, and z) may be determined by using the gyro sensor 180A. In other words, the gyro sensor 180A may be configured to detect a current motion state of the mobile phone 100, for example, a shaken or static state. In this embodiment of this application, the gyro sensor 180A is configured to detect a folding or unfolding operation performed on the display 194, The gyro sensor 180A may report the detected folding operation or unfolding operation to the application processor 110 as an event, to determine a folded state or an unfolded state of the display 194.

The acceleration sensor 180B may detect magnitude of accelerations in various directions (usually on three axes) of the mobile phone 100. In other words, the gyro sensor 180A may be configured to detect the current motion state of the mobile phone 100, for example, the shaken or static state. In this embodiment of this application, the acceleration sensor 180B is configured to detect the folding or unfolding operation performed on the display 194. The acceleration sensor 180B may report the detected folding operation or unfolding operation to the application processor as an event, to determine the folded state or the unfolded state of the display 194.

The optical proximity sensor 180G may include, for example, a light-emitting diode (LED) and an optical detector, for example, a photodiode. The light-emitting diode may be an infrared light-emitting diode. The mobile phone emits infrared light by using the light-emitting diode. The mobile phone detects infrared reflected light from a nearby object by using the photodiode. When sufficient reflected light is detected, it may be determined that there is an object near the mobile phone. When insufficient reflected light is detected, the mobile phone may determine that there is no object near the mobile phone. The optical proximity sensor 180G may be disposed on a first screen of the foldable display 194, and the optical proximity sensor 180G detects a value of a folding angle or an unfolding angle between the first screen and a second screen based on an optical path difference of an infrared signal.

The gyro sensor 180A (or the acceleration sensor 180B) may send detected motion status information (for example, the angular velocity) to the processor 110. The processor 110 determines, based on the motion status information, whether the mobile phone is currently in a handheld state or a tripod state (for example, when the angular velocity is not 0, it indicates that the mobile phone 100 is in the handheld state).

The fingerprint sensor 180H is configured to collect a fingerprint. The mobile phone 100 may use a feature of the collected fingerprint to implement fingerprint unlocking, application lock access, fingerprint-based photographing, fingerprint-based call answering, and the like.

The touch sensor 180K, is also referred to as a "touch panel". The touch sensor 180K may be disposed on the display 194, and the touch sensor 180K and the display 194 form a touchscreen, which is also referred to as a "touch screen". The touch sensor 180K, is configured to detect a touch operation on or near the touch sensor 180K. The touch sensor may transfer the detected touch operation to the application processor, to determine a type of a touch event. The display 194 may provide a visual output related to the touch operation. In some other embodiments, the touch sensor 180K may alternatively be disposed on a surface of the mobile phone 100 and is at a location different from that of the display 194.

For example, the display 194 of the mobile phone 100 displays a home screen, and the home screen includes icons of a plurality of applications (for example, a camera application and a WeChat application). The user taps an icon of the camera application on the home screen by using the touch sensor 180K, to trigger the processor 110 to start the camera application and turn on the camera 193. The display 194 displays an interface of the camera application, for example, a viewfinder interface. In this embodiment of this application, in a process of folding or unfolding the display 194, the processor 110 controls the display location, on the display 194, of the message in the notification bar.

A wireless communication function of the mobile phone 100 may be implemented by through the antenna 1, the antenna 2, the mobile communications module 151, the wireless communications module 152, the modem processor, the baseband processor, and the like.

The antenna 1 and the antenna 2 are configured to transmit and receive electromagnetic wave signals. Each antenna in the mobile phone 100 may be configured to cover one or more communications frequency bands. Different antennas may further be multiplexed, to improve antenna utilization. For example, the antenna 1 may be multiplexed as a diversity antenna in a wireless local area network. In some other embodiments, the antenna may be used in combination with a tuning switch.

The mobile communications module 151 may provide a solution, applied to the mobile phone 100, to wireless communication including 2G, 3G, 4G, 5G. and the like. The mobile communications module 151 may include at least one filter, a switch, a power amplifier, a low noise amplifier (low noise amplifier, LNA), and the like. The mobile communications module 151 may receive an electromagnetic wave through the antenna 1, perform processing such as filtering or amplification on the received electromagnetic wave, and transmit a processed electromagnetic wave to the modem processor for demodulation. The mobile communications module 151 may further amplify a signal modulated by the modem processor, and convert the signal into an electromagnetic wave for radiation through the antenna 1. In some embodiments, at least some function modules of the mobile communications module 151 may be disposed in the processor 110. In some embodiments, at least softie function modules of the mobile communications module 151 and at least some modules of the processor 110 may be disposed in a same device.

The modem processor may include a modulator and a demodulator. The modulator is configured to modulate a to-be-sent low frequency baseband signal into an intermediate/high frequency signal. The demodulator is configured to demodulate a received electromagnetic wave signal into a low frequency baseband signal. Then, the demodulator transmits the low frequency baseband signal obtained through demodulation to the baseband processor for processing. The low frequency baseband signal is processed by the baseband processor, and then transferred to the application processor. The application processor outputs a sound signal through an audio device (which is not limited to the speaker 170A, the receiver 170B, or the like), or displays an image or a video through the display 194. In some embodiments, the modem processor may be an independent device. In some other embodiments, the modem processor may be independent of the processor 110, and is disposed in a same device as the mobile communications module 151 or another function module.

The wireless communications module 152 may provide a solution, applied to the mobile phone 100, to wireless communication including a wireless local area network (wireless local area network, WLAN) (for example, a wireless fidelity (wireless fidelity, Wi-Fi) network), Bluetooth (Bluetooth. BT), a global navigation satellite system (global navigation satellite system, GLASS), frequency modulation (frequency modulation, FM), a near field communication (near field communication, NFC) technology, an infrared (infrared, IR) technology, and the like. The wireless communications module 152 may be one or more devices integrating at least one communications processing module. The wireless communications module 152 receives an electromagnetic wave through the antenna 2, performs frequency modulation and filtering processing on an electromagnetic wave signal, and sends a processed signal to the processor 110. The wireless communications module 152 may further receive a to-be-sent signal from the processor 110, perform frequency modulation and amplification on the signal, and convert the signal into an electromagnetic wave for radiation through the antenna 2.

In addition, the mobile phone 100 may implement an audio function, for example, music playing and recording, by using the audio module 170, the speaker 170A the receiver 170B, the microphone 1700, the headset jack 170D, the application processor, and the like. The mobile phone 100 may receive an input of the button 190, and generate a key signal input related to a user setting and function control of the mobile phone 100. The mobile phone 100 may generate a vibration prompt (for example, an incoming call vibration prompt) by using the motor 191. The indicator 192 in the mobile phone 100 may be an indicator light, may be configured to indicate a charging status and a power change, and may also be configured to indicate a message, a missed call, a notification, and the like. The SIM card interface 195 in the mobile phone 100 is configured to connect to a SIM card. The SIM card may be inserted into the SIM card interface 195 or removed from the SIM card interface 195, to implement contact with or separation from the mobile phone 100.

Figure 1:
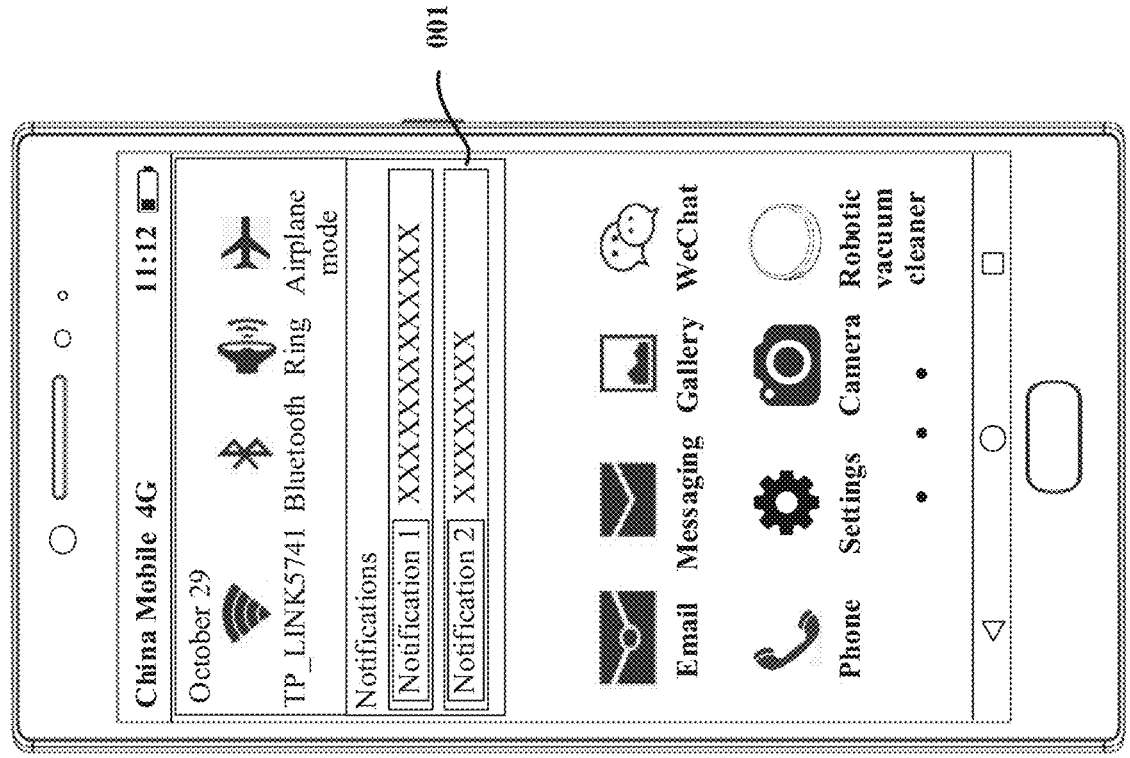
FIG. 1 is a schematic diagram of a foldable mobile phone according to an embodiment of this application.
Figure 1:
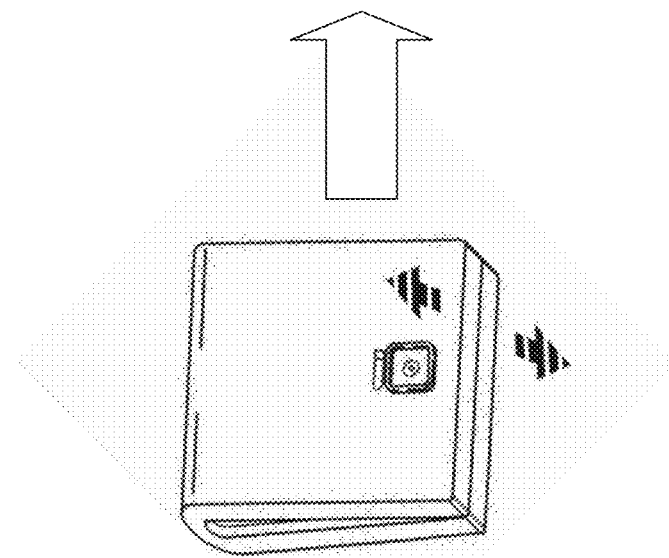

It should be understood that, in actual application, the mobile phone 100 may include more or fewer components than those shown in FIG. 1. This is not limited in this embodiment of this application.

A software system of the mobile phone 100 may use a layered architecture, an event-driven architecture, a microkernel architecture, a micro service architecture, or a cloud architecture. In an embodiment of this application, an Android (Android) system with a layered architecture is used as an example to describe a software structure of the mobile phone 100.

Figure 3:
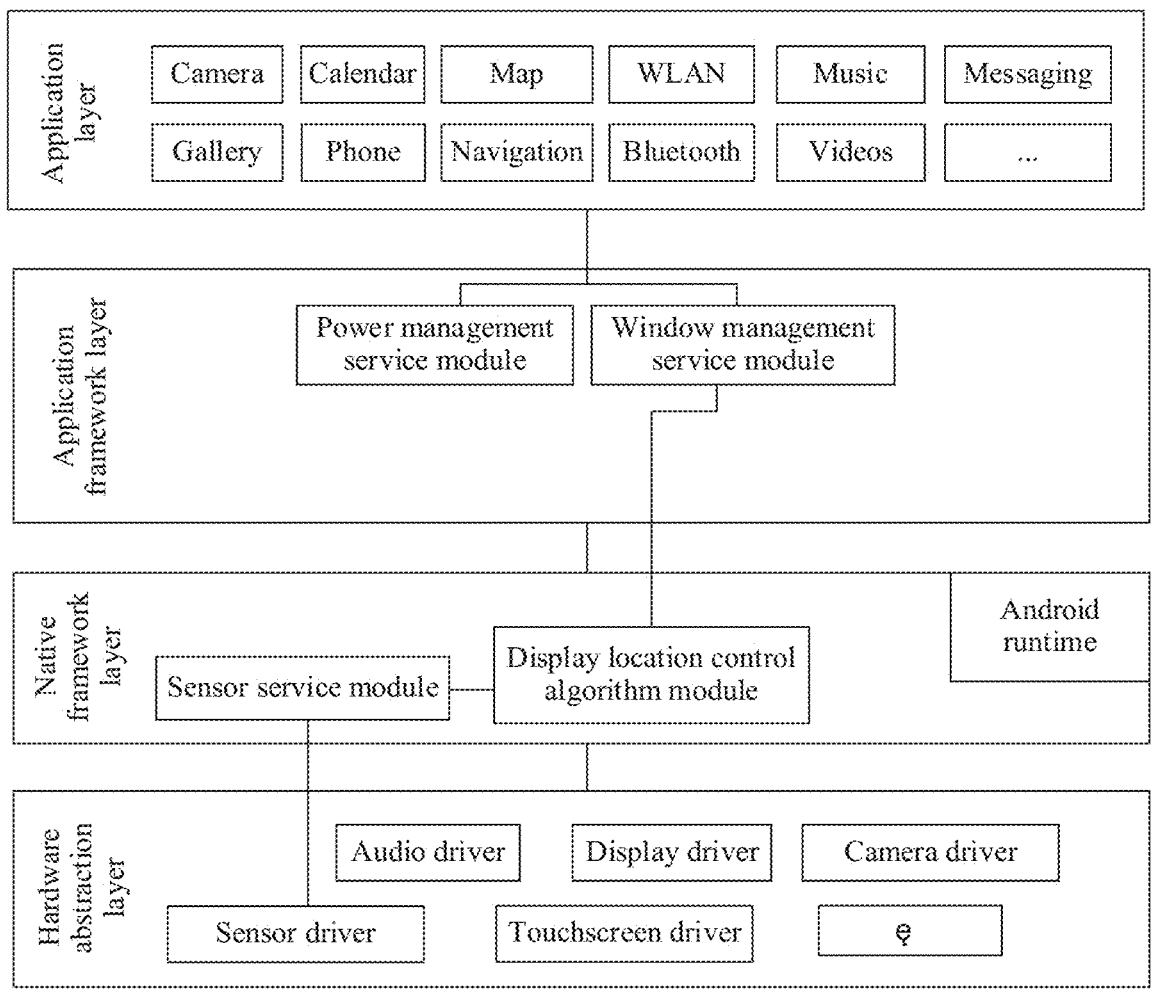
FIG. 3 is a schematic diagram of a structure of an Android operating system according to an embodiment of this application.

FIG. 3 is a block diagram of the software structure of the mobile phone 100 according to an embodiment of this application.

In the layered architecture, software is divided into several layers, and each layer has a clear role and task. The layers communicate with each other through a software interface. In some embodiments, the Android system is divided into four layers: an application layer, an application framework layer, an Android runtime (Android runtime) and a native framework layer (Native framework layer), and a hardware abstraction layer from top to bottom.

The application layer may include a series of application packages.

As shown in FIG. 3, the application packages may include applications such as Camera, Gallery, Calendar, Phone, Map, Navigation, WLAN, Bluetooth, Music, Videos, and Messaging.

The application framework layer provides an application programming interface (application programming interface. API) and a programming framework for an application at the application layer. The application framework layer includes some predefined functions, such as a function for receiving an event sent by the application framework layer.

As shown in FIG. 3, the application framework layer in this embodiment of this application mainly relates to a power management service (Power Manager Service, PMS) module and a window management service (Window Manager Service, WMS) module.

The PMS module is configured to notify the WMS module of a corresponding state when a screen is turned on or off. The WMS module is configured to manage an upper-layer display window.

The Android runtime includes a kernel library and a virtual machine. The Android runtime is responsible for scheduling and management of the Android system. The kernel library includes two parts: a function that needs to be invoked in a Java language and a kernel library of Android.

The application layer and the application framework layer run on the virtual machine. The virtual machine executes Java files at the application layer and the application framework layer as binary files. The virtual machine is configured to perform functions such as object life cycle management, stack management, thread management, security and exception management, and garbage collection.

The native framework layer may include a plurality of function modules, for example, a sensor service module and a display location control algorithm module.

The sensor service module reports a folded status of a foldable touchscreen. For a specific reporting manner of the sensor service module, refer to the conventional technology.

The display location control algorithm module mainly controls a display location of a message in a notification bar based on an included angle determined by the sensor service module and a landscape or portrait state of the foldable screen. In other words, in a folding or unfolding process, the display location of the message in the notification bar changes with a value of the included angle.

The hardware abstraction layer is a layer of hardware and software. The hardware abstraction layer includes at least a display driver, a camera driver, an audio driver, a sensor driver, a touchscreen driver, and the like. In this embodiment of this application, the sensor driver is mainly configured to enable a sensor, and perform registration monitoring on the sensor, that is, monitor an included angle of the foldable screen at each moment. The touchscreen driver is mainly configured to obtain a touch event on the foldable touchscreen, and report the touch event.

The following embodiments may be all implemented by the mobile phone 100 having the foregoing hardware structure. In the following embodiments, the mobile phone 100 is used as an example to describe the touchscreen display method provided in the embodiments of this application.

Figure 4A:
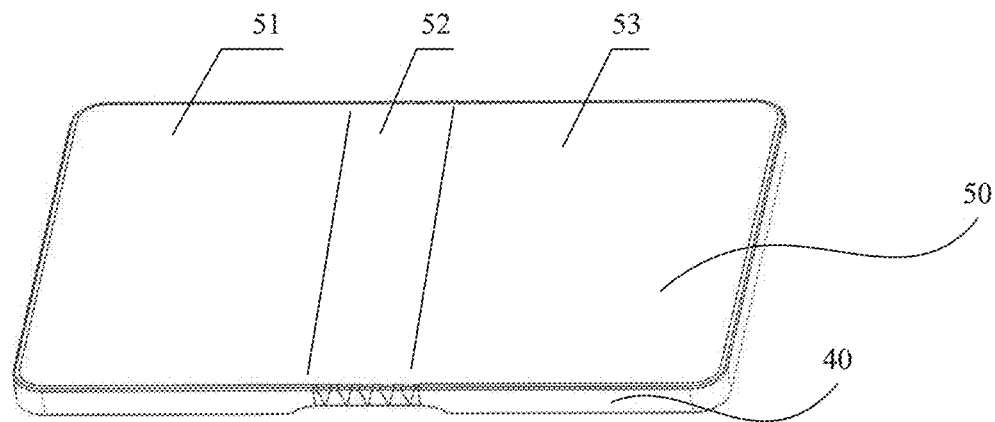
FIG. 4a and FIG. 4h are schematic diagrams of an unfolded state of a mobile phone according to an embodiment of this application.
Figure 4B:
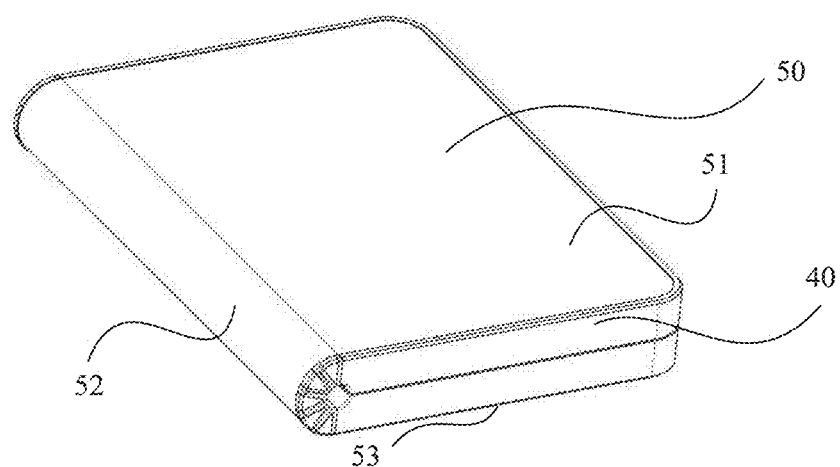

FIG. 4a and FIG. 4b are schematic diagrams of an unfolded state and a folded state of a mobile phone according to an embodiment of this application. A foldable touchscreen 50 provided in this embodiment of this application is applied to a foldable mobile phone. FIG. 4a shows a situation of the mobile phone when the mobile phone is unfolded, and FIG. 4b shows a shape of the mobile phone after folding. First, as shown in FIG. 4a, when the mobile phone is unfolded, a housing 40 of the mobile phone is unfolded. In addition, the foldable touchscreen 50 is also unfolded. As shown in FIG. 4h, when the mobile phone is folded, the housing 40 of the mobile phone is also folded. In addition, the foldable touchscreen 50 is also folded. This is a case in which the mobile phone is folded outward, namely, a case in which a display is exposed outside after the mobile phone is folded. It should be understood that the mobile phone may alternatively be folded inward, To be specific, after the mobile phone is folded, the display is folded and hidden inside, and the housing 40 is exposed outside.

The foldable touchscreen provided in this embodiment of this application may be one integrated flexible display, or may be a display including two rigid screens and one flexible screen located between the two rigid screens. With reference to FIG. 4a, it is assumed that the foldable touchscreen provided in this embodiment of this application includes three parts: a first screen 51, a second screen 53, and a bendable area 52 that connects the first screen 51 and the second screen 53. When the foldable touchscreen of the mobile phone is unfolded, the first screen 51, the second screen 53, and the bendable area 52 are connected to form an integrated screen, a sensor module 180 detects that an included angle between the first screen 51 and the second screen 53 is 180 degrees (where an actual angle may not reach 180 degrees, and an actually reported angle is used), as shown in FIG. 4a. When the foldable touchscreen of the mobile phone is fully folded, the sensor module 180 detects that an included angle between the first screen 51 and the second screen 53 is 0 degrees (where an actual angle may not reach 0 degrees, and an actually reported angle is used), as shown in FIG. 4b.

Figure 5A:
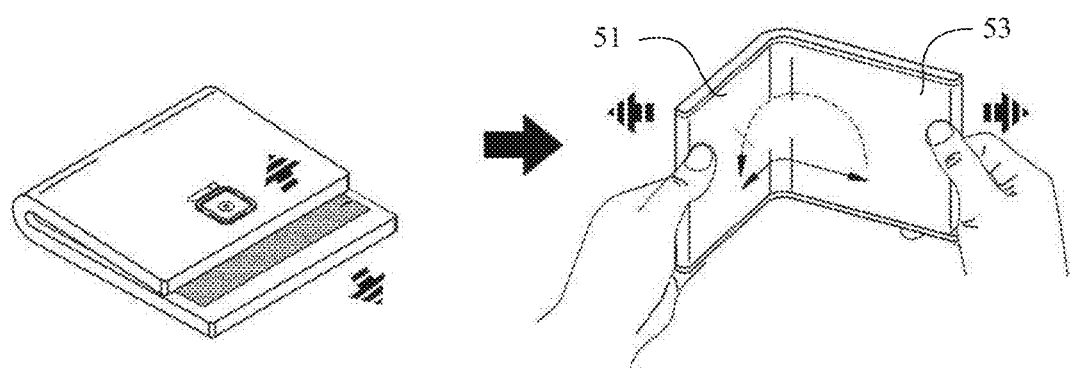
FIG. 5a and FIG. 5b are schematic diagrams of another unfolded state of a mobile phone according to an embodiment of this application.
Figure 5B:
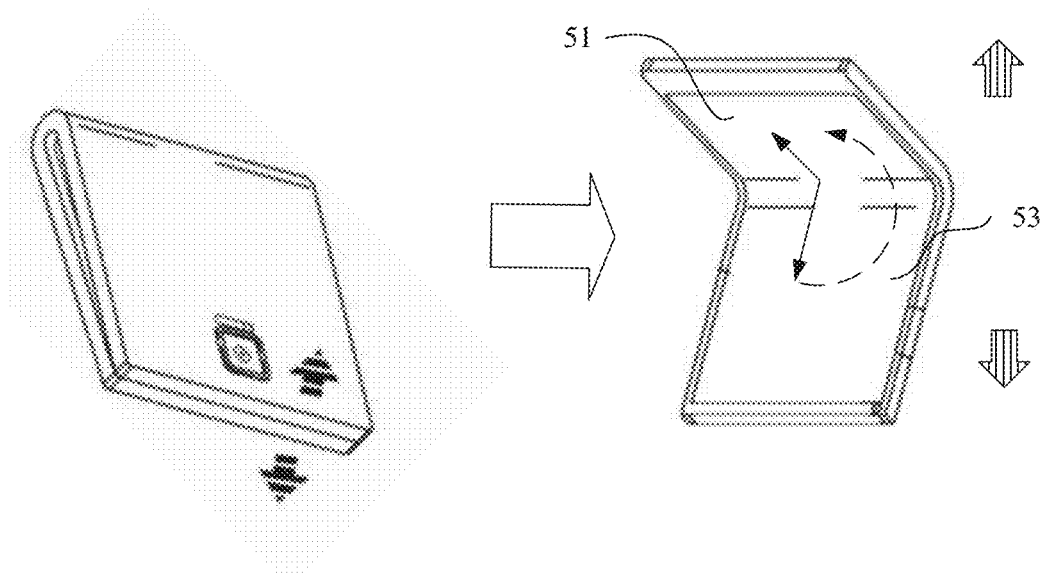

FIG. 5a is a schematic diagram of a process of unfolding the mobile phone according to an embodiment of this application. In FIG. 5a, a user performs a left-right unfolding operation on the mobile phone in a fully folded state. After the mobile phone is unfolded, the display of the mobile phone is in a landscape state. The first screen 51 is a screen held by the user with the left hand, and the second screen 53 is a screen held by the user with the right hand. In FIG. 5b, the user performs an up-down unfolding operation on the mobile phone in a fully folded state. After the mobile phone is unfolded, the display of the mobile phone is in a portrait state. The first screen 51 is an upper-half screen, and the second screen 53 is a lower-half screen.

Figure 6:
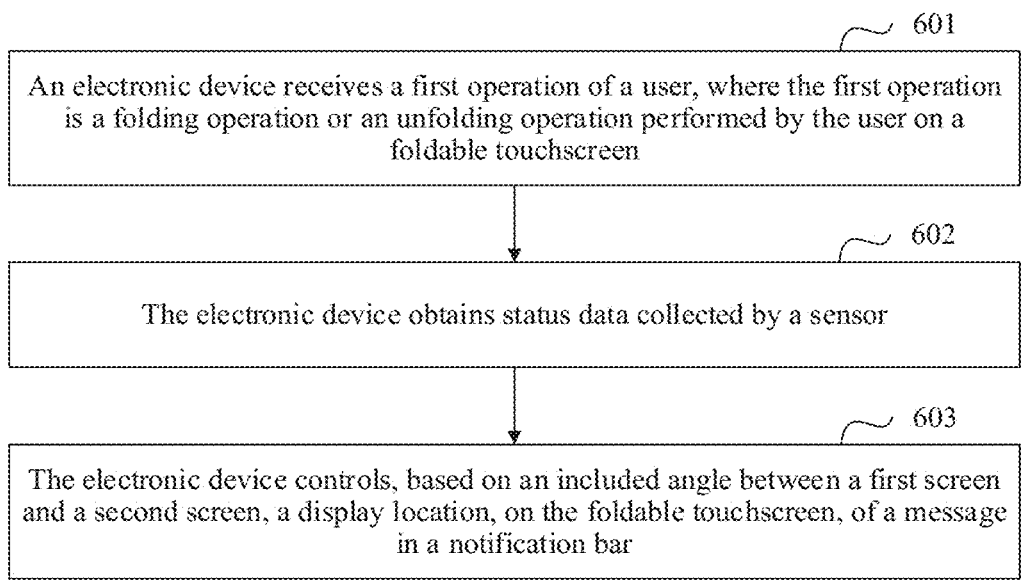
FIG. 6 is a schematic flowchart of a touchscreen display method according to an embodiment of this application.

Based on the structures of the foldable touchscreen shown in FIG. 2, FIG. 4a, and FIG. 4h, an embodiment of this application provides a touchscreen display method. As shown in FIG. 6, the method is applicable to an electronic device having the foldable touchscreen shown in FIG. 4a and FIG. 4b.

Step 601: A processor 110 in the electronic device receives a first operation of a user, where the first operation may be a folding operation or an unfolding operation performed by the user on the foldable touchscreen. For example, it is assumed that the electronic device is the mobile phone 100 shown in FIG. 2. The user performs the left-right unfolding operation shown in FIG. 5a on the mobile phone 100, or the user performs the up-down unfolding operation shown in FIG. 5b on the mobile phone 100.

Step 602: The processor 110 in the electronic device obtains status data collected by the sensor module 180, where the status data includes an included angle between a first screen and a second screen at each moment.

Specifically, as shown in FIG. 2 and FIG. 3, the acceleration sensor 180B and the gyro sensor 180A of the mobile phone periodically collect the status data, where the status data includes the included angle between the first screen and the second screen; and send, to the sensor driver, a sensor event including the status data. The sensor driver forwards the sensor event to the sensor service module. Then, the sensor service module sends the sensor event to the display location control algorithm module.

Step 603: The processor 110 in the electronic device controls, based on the included angle between the first screen and the second screen, a display location, on the foldable touchscreen, of a message in a notification bar.

Specifically, the acceleration sensor 180B and the gyro sensor 180A may periodically report the sensor event to the display location control algorithm module in the processor 110 of the mobile phone 100, that is, report an included angle between the first screen and the second screen to the processor 110 at a specific interval. When values of the included angles are in different angle ranges, the processor 110 controls the display location, on the foldable touchscreen, of the message in the notification bar to be different.

For example, when the user performs the left-right unfolding operation shown in FIG. 5a on the mobile phone, the processor 110 of the mobile phone 100 receives a value of an included angle reported by the sensor module 180. The display location control algorithm module in the processor 110 may determine, based on an angle range in which the included angle is, that the message in the notification bar is located on the screen on which the right hand of the user is located. According to the method, in a process of folding or unfolding the foldable screen of the electronic device having the foldable screen, the message in the notification bar may be adaptively displayed on a corresponding screen, so that the user can view the message in a timely manner.

The following describes in detail the touchscreen display method provided in this embodiment of this application with reference to the accompanying drawings and application scenarios. It should be noted that the folding process and the unfolding process are actually mutually inverse processes, and there is no difference in processing methods except that an angle change trend is opposite. In the following embodiments of this application, the folding process is used as an example for description, Scenario 1

As shown in FIG. 5a, the user performs the left-right unfolding operation on the mobile phone in the fully folded state, and the foldable touchscreen is in a landscape state. Specific cases in which the processor 110 controls, based on different included angles between the first screen and the second screen, the display location, on the foldable touchscreen, of the message in the notification bar are as follows.

Case 1

Figure 7A:
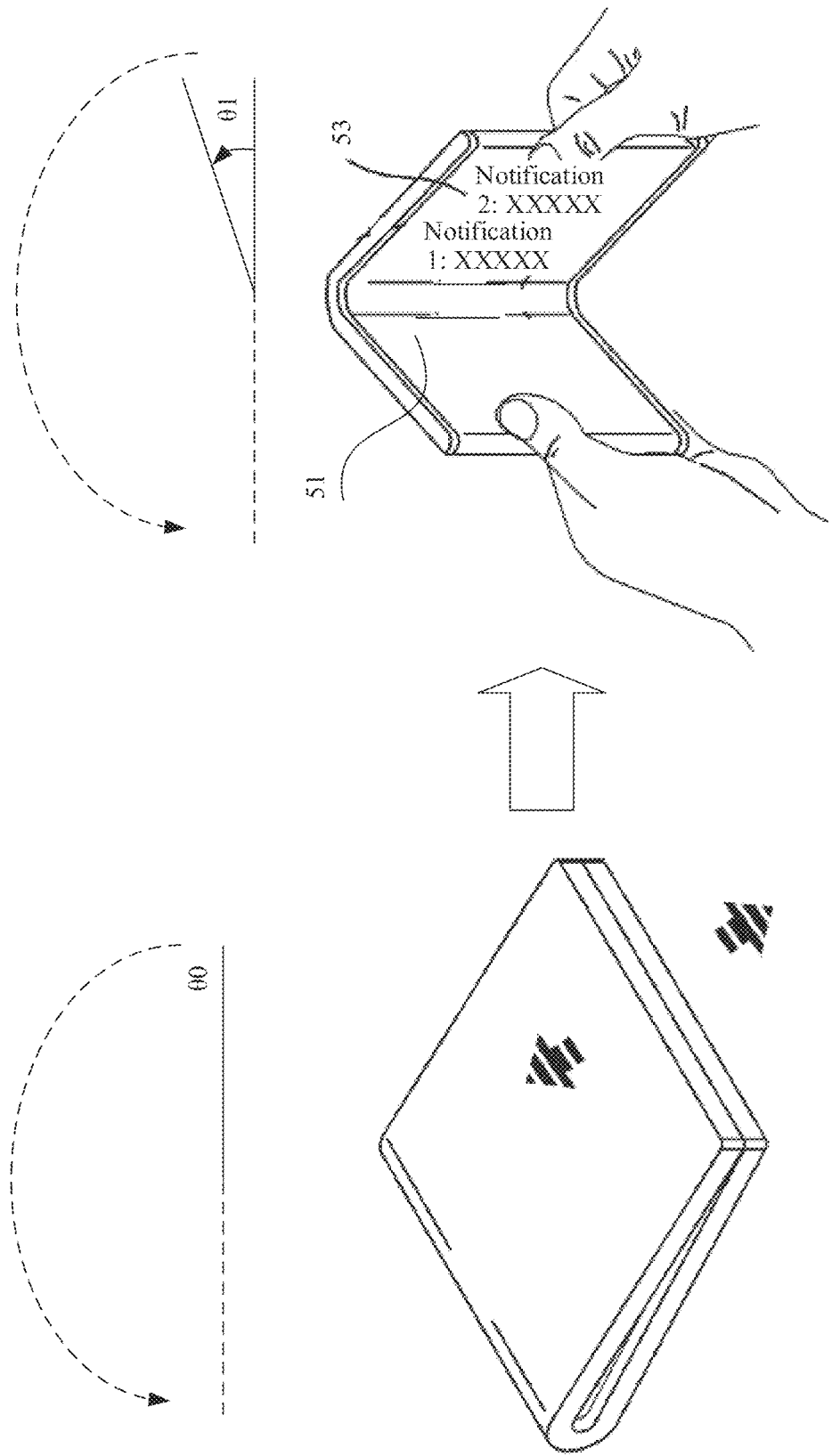
FIG. 7a to FIG. 7d are a schematic diagram of an angle change trend in an unfolding scenario according to an embodiment of this application.

When a difference between the included angle between the first screen 51 and the second screen 53 and 0 degrees is less than or equal to a first angle threshold, the processor 110 controls the message in the notification bar to be displayed on an edge of a bottom of the second screen 53 that is on a right side. A specific value of the first angle threshold may be obtained based on experience. For example, the first angle threshold is 20 degrees. For example, as shown in FIG. 7a, it is assumed that there are two notification messages in the notification bar, and the user performs the left-right unfolding operation on the fully folded mobile phone (here θ0 is equal to 0 degrees). When a difference between an included angle θ1 and 0 degrees is less than or equal to 20 degrees, the two notification messages are displayed on the edge of the bottom of the second screen 53. The bottom is far from the bendable area, and display directions of the two notification messages are parallel to the bottom.

In a possible embodiment, when a quantity of messages exceeds one, a message displayed on the edge of the bottom of the second screen 53 may be a new message closest to a current moment, and other messages are arranged and displayed from the edge to an inner side in descending order of receiving time. The inner side is close to the bendable area. It can be learned that the method is convenient for the user to view and reply to a newly received new message in a timely manner, to improve processing efficiency.

Figure 7B:
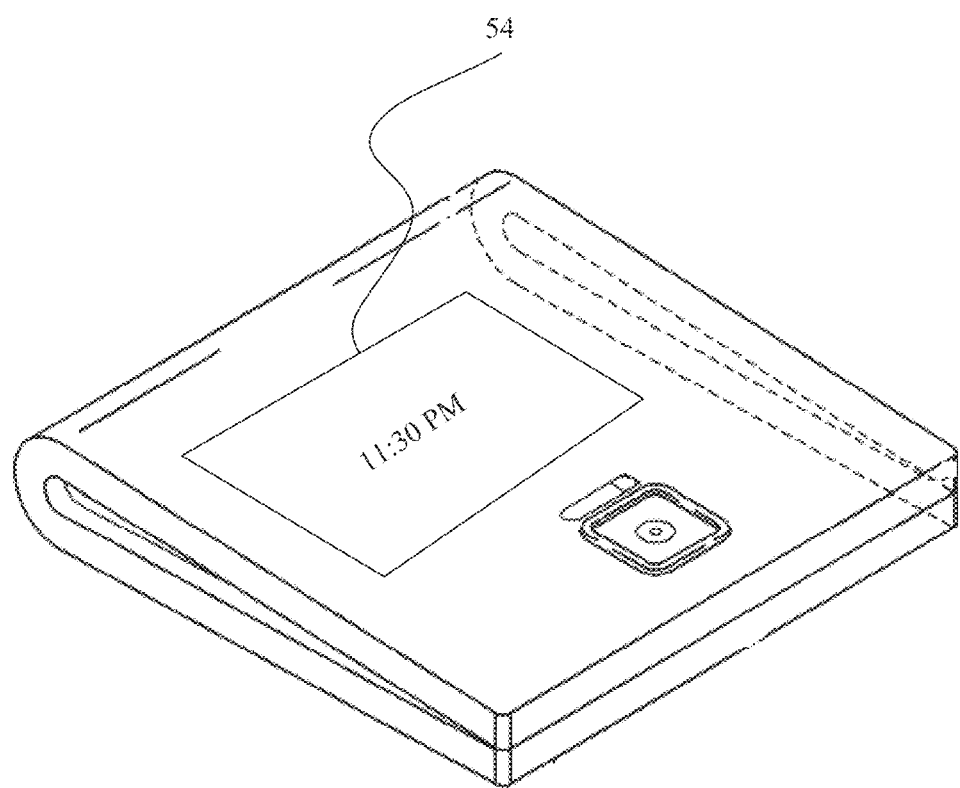

In a possible embodiment, the foldable touchscreen to which this application is applicable may have a small screen 54 shown in FIG. 7b. When the foldable touchscreen is fully folded, the small screen 54 may be configured to display time or display an unread message.

Case 2

Figure 7C:
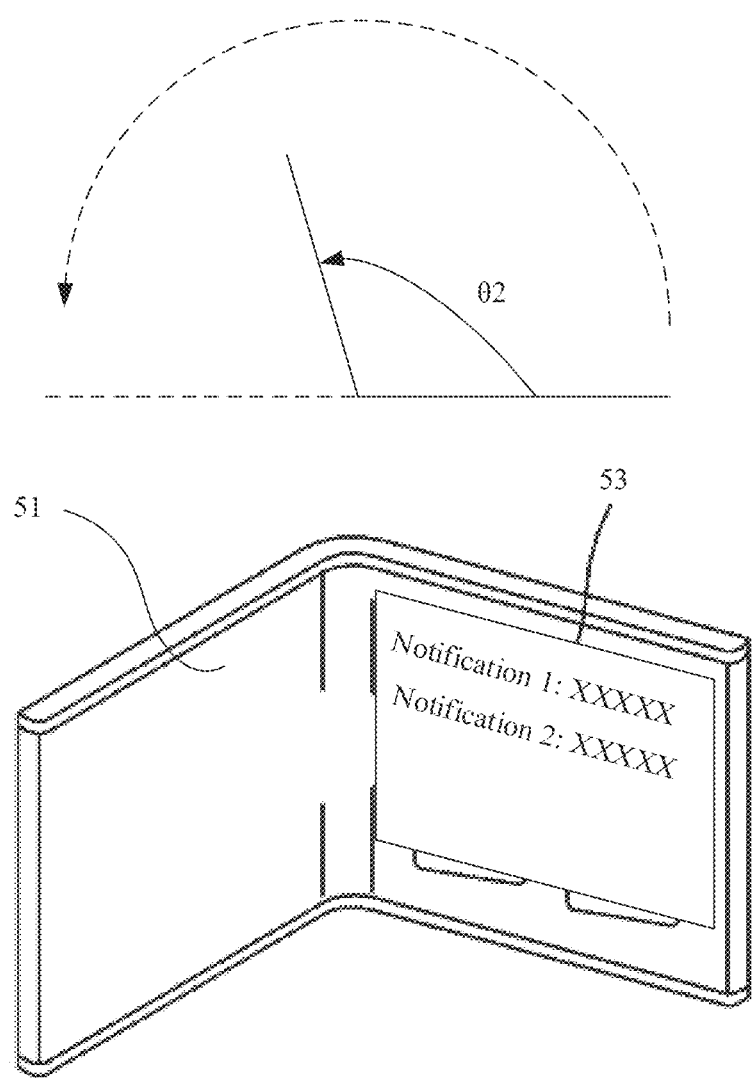

When an absolute value of a difference between the included angle between the first screen 51 and the second screen 53 and 90 degrees is less than or equal to a second angle threshold, the processor 110 controls the message in the notification bar to be displayed on an edge of an upper side of the second screen 53 that is on a right side. A specific value of the second angle threshold may be obtained based on experience. For example, the second angle threshold may be 30 degrees, and a value range of the included angle is [60, 120]. For example, as shown in FIG. 7c, it is assumed that there are two new messages in the notification bar, and the user performs the left-right unfolding operation on the fully folded mobile phone. When an absolute value of a difference between an included angle θ2 and 90 degrees is less than or equal to 30 degrees, for example, when θ2 is 100 degrees, the two notification messages are displayed on the edge of the upper side of the second screen 53. The upper side of the second screen 53 is far from a horizon plane, and display directions of the notification messages in the notification bar are parallel to the horizontal plane.

In a possible embodiment, when a quantity of messages exceeds one, a message displayed on the edge of the upper side of the second screen 53 may be a new message closest to a current moment, and other messages are arranged and displayed from the edge to a lower side in descending order of receiving time. The lower side is close to the horizontal plane.

Case 3

Figure 7D:
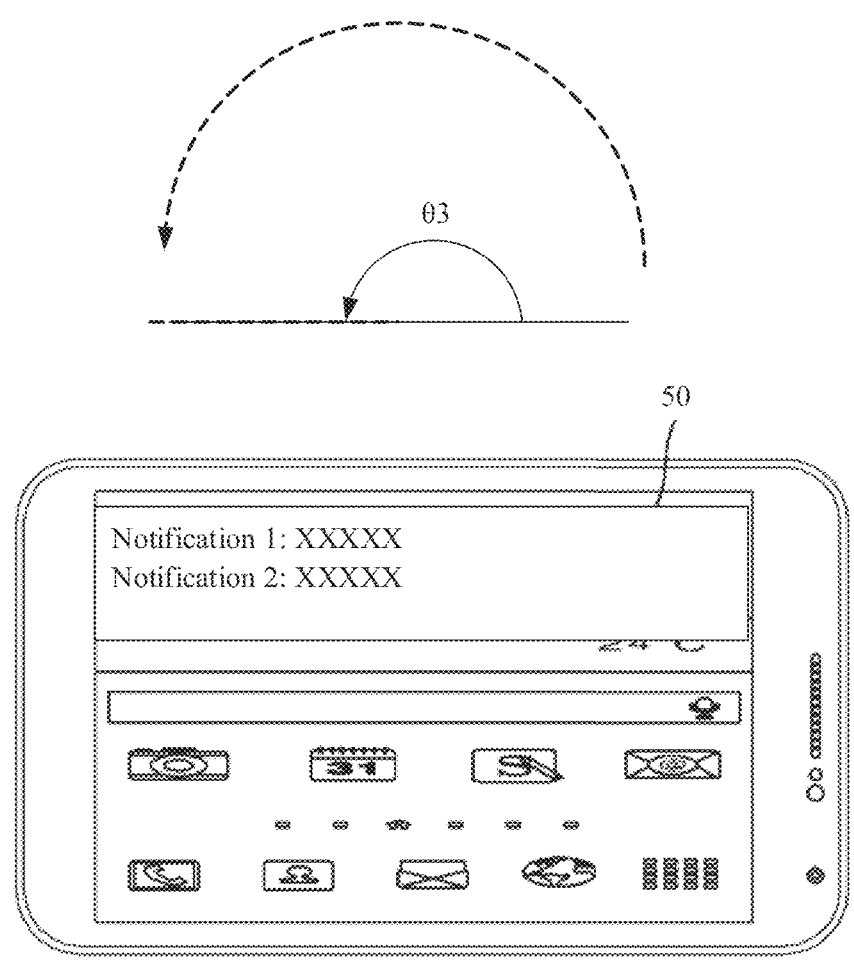

When a difference between 180 degrees and the included angle between the first screen 51 and the second screen 53 is less than or equal to a third angle threshold, the processor 110 controls the message in the notification bar to be displayed on an edge of an upper side of a large screen including the first screen and the second screen. A specific value of the third angle threshold may be obtained based on experience. For example, the third angle threshold may be 20 degrees. For example, as shown in FIG. 7d, it is assumed that there are two new messages in the notification bar, and the user performs the left-right unfolding operation on the fully folded mobile phone. When a difference between 180 degrees and an included angle θ3 is less than or equal to 20 degrees, for example, when θ3 is 180 degrees, the two notification messages are displayed on the edge of the upper side of the large screen (namely, the foldable touchscreen 50) including the first screen and the second screen. The upper side of the foldable touchscreen 50 is far from the ground, and display directions of the messages in the notification bar are parallel to the horizontal plane.

In a possible embodiment, when a quantity of messages exceeds one, a message displayed on the edge of the upper side of the foldable touchscreen 50 may be a new message closest to a current moment, and other messages are arranged and displayed from the edge of the upper side to a lower side in descending order of receiving time. The lower side is close to the horizontal plane.

Case 4

When the foldable touchscreen switches from the fully folded state to a fully unfolded state, the processor 110 controls the display location of the message in the notification bar to gradually move from an edge of a bottom of the second screen to an edge of an upper side of a large screen including the first screen and the second screen.

For example, to be specific, it is assumed that there are two new messages in the notification bar, and the user performs the left-right unfolding operation on the fully folded mobile phone in a landscape state. An unfolding angle increases first from θ1 to θ2, and then from θ2 to θ3. In this case, the processor 110 first controls the display location of the message in the notification bar to gradually move from an edge of a bottom of the second screen 53 (as shown in the right figure in FIG. 7a) to an edge of an upper side of the second screen 53 (as shown in FIG. 7c), and then gradually move from the edge of the upper side of the second screen 53 to an edge of an upper side of the foldable touchscreen 50 (as shown in FIG. 7d).

Case 5

When the foldable touchscreen switches from a fully unfolded state to the fully folded state, the processor 110 controls the display location of the message in the notification bar to gradually move from an edge of an upper side of a large screen including the first screen and the second screen to an edge of a bottom of the second screen.

For example, to be specific, it is assumed that there are two new messages in the notification bar, and the user performs the folding operation on the fully unfolded mobile phone in a landscape state. A folding angle decreases first from θ3 to θ2, and then from θ2 to θ1. In this case, the processor 110 first controls the display location of the message in the notification bar to gradually move from an edge of an upper side of the foldable touchscreen 50 (as shown in FIG. 7d) to an edge of an upper side of the second screen 53 (as shown in FIG. 7c), and then gradually move from the edge of the upper side of the second screen 53 to an edge of a bottom of the second screen 53 (as shown in the right figure in FIG. 7a).

Scenario 2

As shown in FIG. 5b, the user performs the up-down unfolding operation on the mobile phone in the fully folded state, and the foldable touchscreen is in a portrait state. Specific cases in which the processor 110 controls, based on different included angles between the first screen and the second screen, the display location, on the foldable touchscreen, of the message in the notification bar are as follows.

Case 1

When a difference between the included angle between the first screen 51 and the second screen 53 and 0 degrees is less than or equal to a first angle threshold, the processor 110 controls the message in the notification bar to be displayed on an edge of a bottom of the second screen. The second screen is a lower screen, and the bottom of the second screen is far from the bendable area. A specific value of the first angle threshold may be obtained based on experience. For example, the first angle threshold is 20 degrees.

Figure 8A:
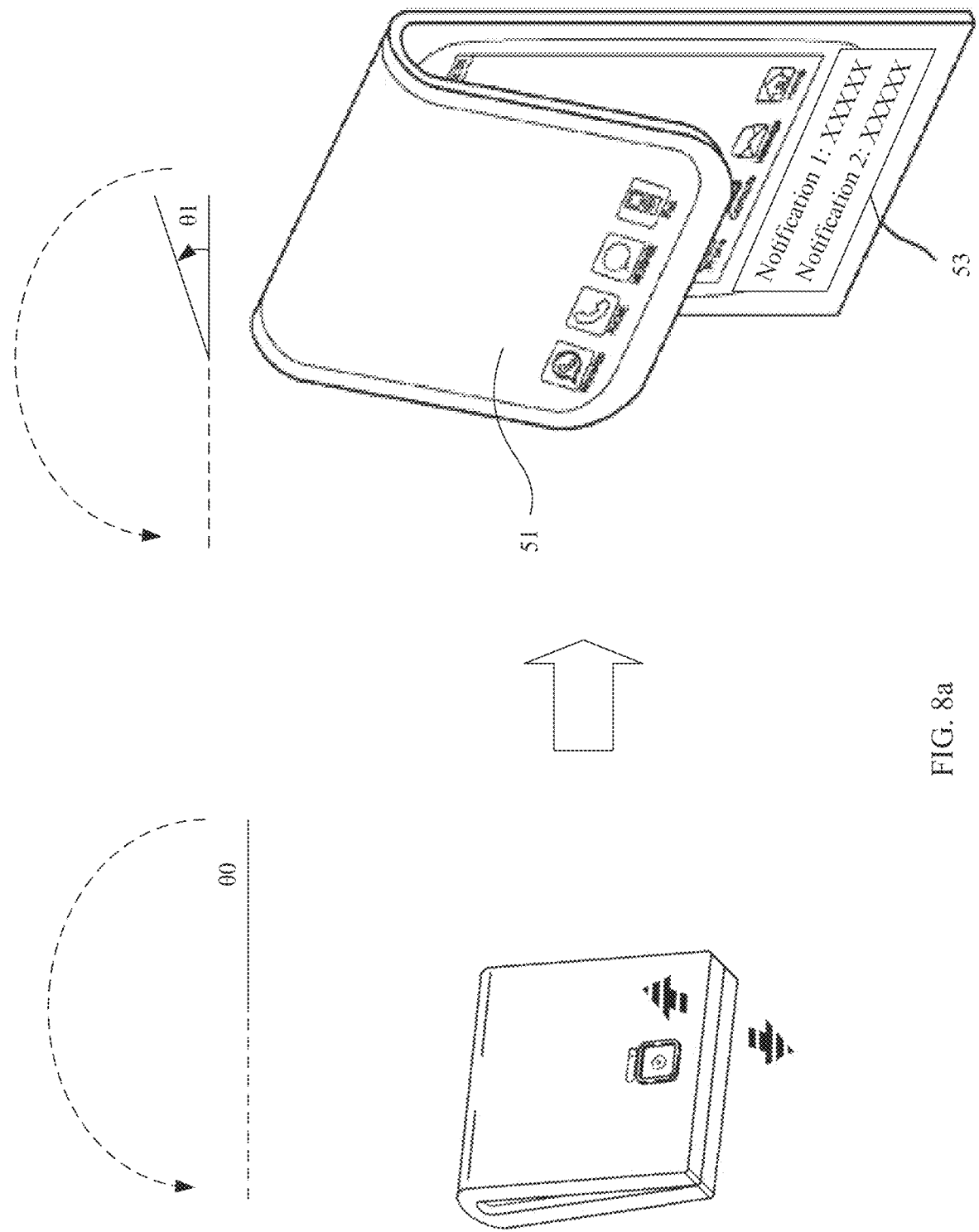

For example, as shown in FIG. 8a, it is assumed that there are two notification messages in the notification bar, and the user performs the up-down unfolding operation on the fully folded mobile phone (where θ0 is equal to 0 degrees). \Mien a difference between an included angle θ1 and 0 degrees is less than or equal to 20 degrees, the two notification messages are displayed on the edge of the bottom of the second screen 53.

In a possible embodiment, when a quantity of messages exceeds one, a message displayed on the edge of the bottom of the second screen 53 may be a new message closest to a current moment, and other messages are arranged and displayed from the edge of the bottom to an inner side in descending order of receiving time. The inner side is close to the bendable area.

Case 2

When an absolute value of a difference between the included angle between the first screen 51 and the second screen 53 and 90 degrees is less than or equal to a second angle threshold, the processor 110 controls the message in the notification bar to be displayed on an edge of a top of the second screen 53. The top of the second screen 53 is adjacent to the bendable area. A specific value of the second angle threshold may be obtained based on experience. For example, the second angle threshold is 20 degrees. When a value range of the included angle between the first screen 51 and the second screen 53 is [70, 110], the processor 110 controls the message in the notification bar to be displayed on the edge of the top of the second screen 53.

Figure 8B:
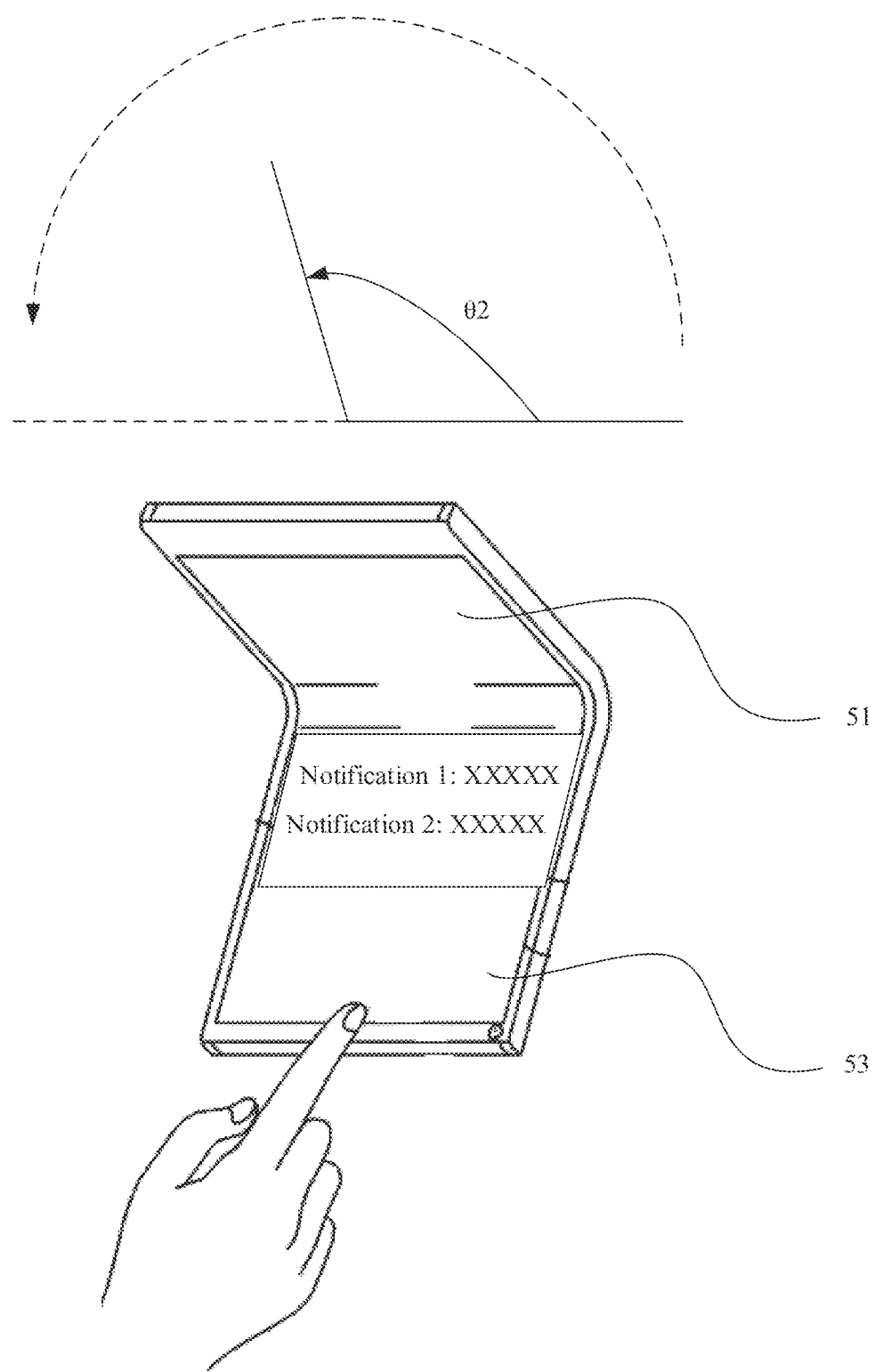

For example, as shown in FIG. 8b, it is assumed that there are two notification messages in the notification bar, and the user performs the up-down unfolding operation on the fully folded mobile phone. When a difference between an included angle θ2 and 90 degrees is less than or equal to 20 degrees, for example, θ2 is 100 degrees, the two notification messages are displayed on the edge of the top of the second screen 53. The top is adjacent to the bendable area.

In a possible embodiment, when a quantity of messages exceeds one, a message displayed on the edge of the top of the second screen 53 may be a new message closest to a current moment, and other messages are arranged and displayed from the edge of the top to a bottom in descending order of receiving time. The bottom is far from the bendable area.

Case 3

When a difference between 180 degrees and the included angle between the first screen 51 and the second screen 53 is less than or equal to a third angle threshold, the processor 110 controls the message in the notification bar to be displayed on an edge of a top of the first screen. The top of the first screen is far from the bendable area. A specific value of the second angle threshold may be obtained based on experience. For example, the third angle threshold is 20 degrees.

Figures 1, 8C:
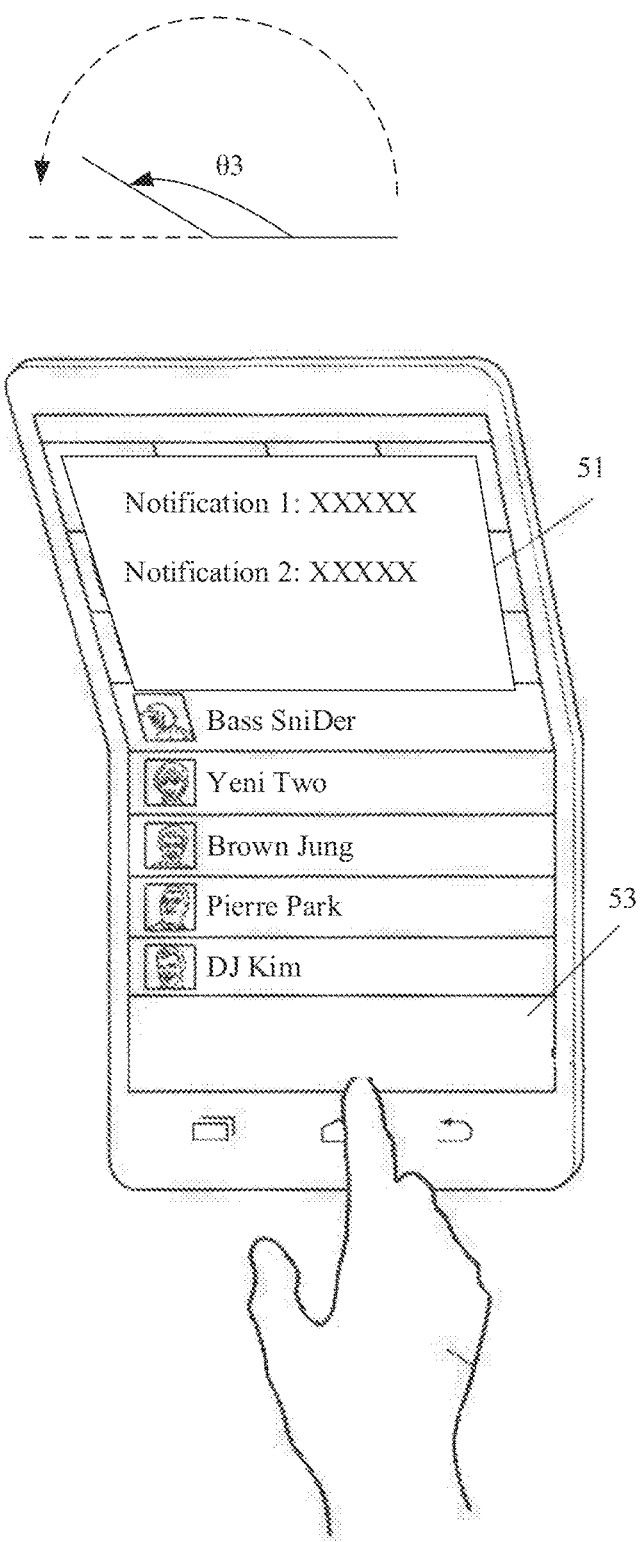
Figures 2, 8C:
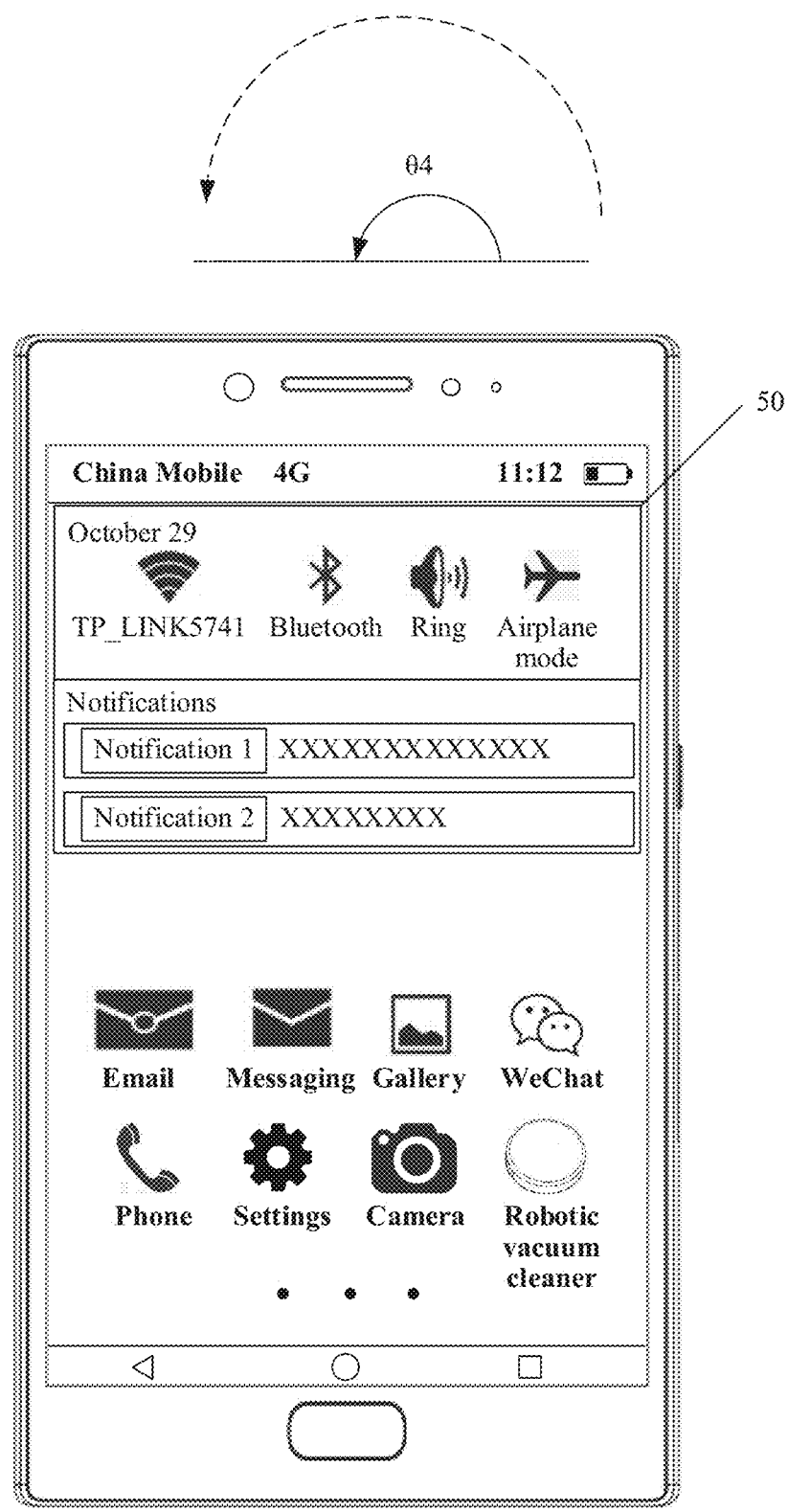

For example, as shown in FIG. 8c-1, it is assumed that there are two notification messages in the notification bar, and the user performs the up-down unfolding operation on the fully folded mobile phone. When a difference between 180 degrees and an included angle θ3 is less than or equal to 20 degrees, for example, θ3 is 160 degrees, the two notification messages are displayed on the edge of the top of the first screen 51. Alternatively, when the included angle θ3 is 180, the two notification messages are displayed in a notification bar of the first screen 51.

In a possible embodiment, when a quantity of messages exceeds one, a message displayed on the edge of the top of the first screen 51 may be a new message closest to a current moment, and other messages are arranged and displayed from the edge of the top to a bottom in descending order of receiving time. The bottom is close to the bendable area.

Case 4

When the foldable touchscreen switches from the fully folded state to a fully unfolded state, the processor 110 controls the display location of the message in the notification bar to gradually move from an edge of a bottom of the second screen 53 to an edge of a top of the first screen 51.

For example, to be specific, it is assumed that there are two new messages in the notification bar, and the user performs the up-down unfolding operation on the fully folded mobile phone in a portrait state. An unfolding angle increases first from θ1 to θ2, and then from θ2 to θ3. In this case, the processor 110 controls the display location of the message in the notification bar gradually move from the edge of the bottom of the second screen 53 (as shown in the right figure in FIG. 8a) to an edge of a top of the second screen 53 (as shown in FIG. 8b), and then gradually move from the edge of the top of the second screen 53 to an edge of an upper side of the foldable touchscreen 50 (as shown in the figure in FIG. 8c-1 or FIG. 8c-2).

Case 5

When the foldable touchscreen switches from a fully unfolded state to the fully folded state, the processor 110 controls the display location of the message in the notification bar to gradually move from an edge of a top of the first screen 51 to an edge of a bottom of the second screen 53.

For example, to be specific, it is assumed that there are two new messages in the notification bar, and the user performs the up-down folding operation on the fully unfolded mobile phone in a portrait state. An unfolding angle decreases first from θ3 to θ2, and then from θ2 to θ0. In this case, the processor 110 controls the display location of the message in the notification bar to gradually move from an edge of an upper side of the foldable touchscreen 50 (as shown in the figure in FIG. 8c-1 or FIG. 8c-2) to an edge of a top of the second screen 53 (as shown in FIG. 8b), and then gradually move from the edge of the top of the second screen 53 to the edge of the bottom of the second screen 53 (as shown in the right figure in FIG. 8a).

Scenario 3

The user performs the left-right unfolding operation on the mobile phone in a fully rolled state, and the foldable touchscreen is in a landscape state. Specific cases in Which the processor 110 controls, based on a rolled status, the display location, on the rollable touchscreen, of the message in the notification bar are as follows.

Case 1

Figure 9B:
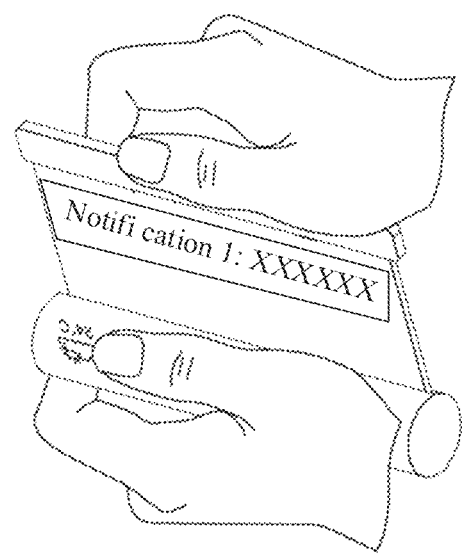
FIG. 9a to FIG. 9c are a schematic diagram of an angle change trend in another unfolding scenario according to an embodiment of this application.
Figure 9A:
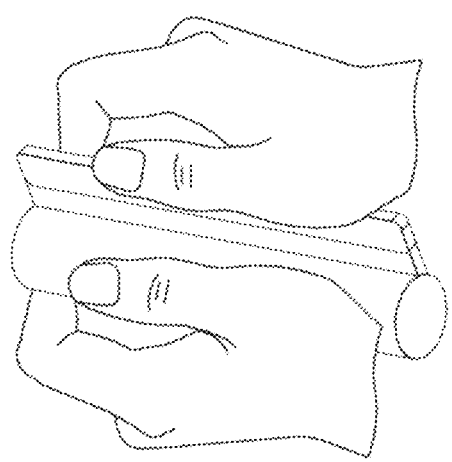

When the rollable touchscreen rolled into a housing is stretched to be semi-unfolded, the processor 110 controls the message in the notification bar to be displayed on an edge of a right side of an unfolded touchscreen. For example, as shown in FIG. 9a and FIG. 9b, it is assumed that there is one notification message in the notification bar, and the user performs the left-right unfolding operation on the fully roiled mobile phone (refer to FIG. 9a), to unfold the mobile phone to a state shown in FIG. 9b. The processor 110 controls the notification message to be vertically displayed on an edge of a right side of the rollable touchscreen. In another possible embodiment, the processor 110 may alternatively control the notification message to be horizontally displayed on the unfolded touchscreen of the rollable touchscreen.

In a possible embodiment, when a quantity of messages exceeds one, a message displayed on the edge of the right side of the unfolded rollable touchscreen may be a new message closest to a current moment, and other messages are arranged and displayed from the edge to an inner side in descending order of receiving time. The inner side directs to a rolling shaft.

Case 2

Figure 9C:
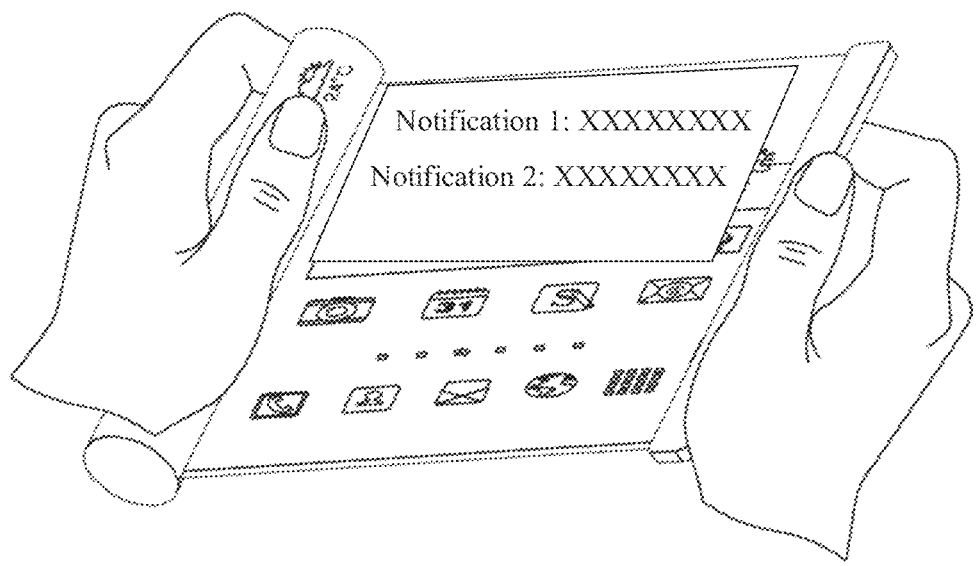

When the rollable touchscreen rolled into a housing is stretched to be fully unfolded, the processor 110 controls the message in the notification bar to be displayed on an edge of an upper side of an unfolded touchscreen. For example, as shown in FIG. 9c, it is assumed that there is one notification message in the notification bar, and the user performs the left-right unfolding operation on the fully rolled mobile phone (refer to FIG. 9a), to unfold the mobile phone to a state shown in FIG. 9c. The processor 110 controls the notification message to be horizontally displayed on a notification bar of the rollable touchscreen.

Scenario 4

The user performs the up-down unfolding operation on the mobile phone in a fully rolled state, and the foldable touchscreen is in a portrait state. Specific cases in which the processor 110 controls, based on a rolled status, the display location, on the rollable touchscreen, of the message in the notification bar are as follows.

Case 1

Figure 10A:
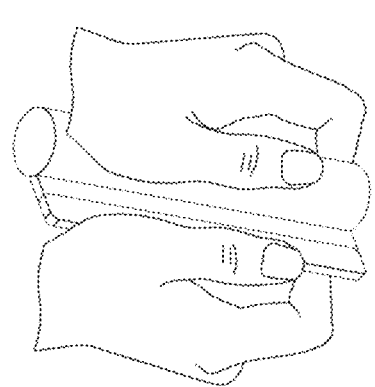
FIG. 10a to FIG. 10c are a schematic diagram of an angle change trend in another unfolding scenario according to an embodiment of this application.
Figure 10B:
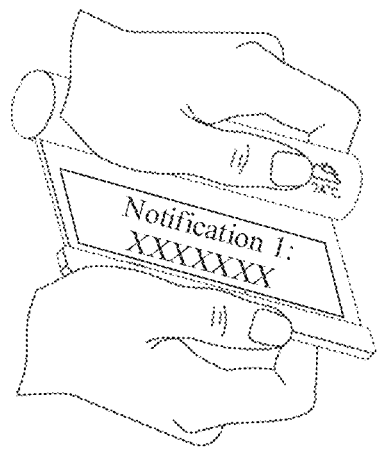

When the rollable touchscreen rolled into a housing is stretched to be semi-unfolded, the processor 110 controls the message in the notification bar to be displayed on an edge of a bottom of an unfolded touchscreen. The bottom is close to a horizontal plane. For example, as shown in FIG. 10a and FIG. 10b, it is assumed that there is one notification message in the notification bar, and the user performs the up-down unfolding operation on the fully rolled mobile phone (refer to FIG. 10a), to unfold the mobile phone to a state shown in FIG. 10b. The processor 110 controls the notification message to be horizontally displayed on an edge of a bottom of the rollable touchscreen.

In a possible embodiment, when a quantity of the messages exceeds one, the message displayed on the edge of the bottom of the unfolded rollable touchscreen may be a new message closest to a current moment, and other messages are arranged and displayed from the edge of the bottom to a top in descending order of receiving time. The top is far from the horizontal plane.

Case 2

Figure 10C:
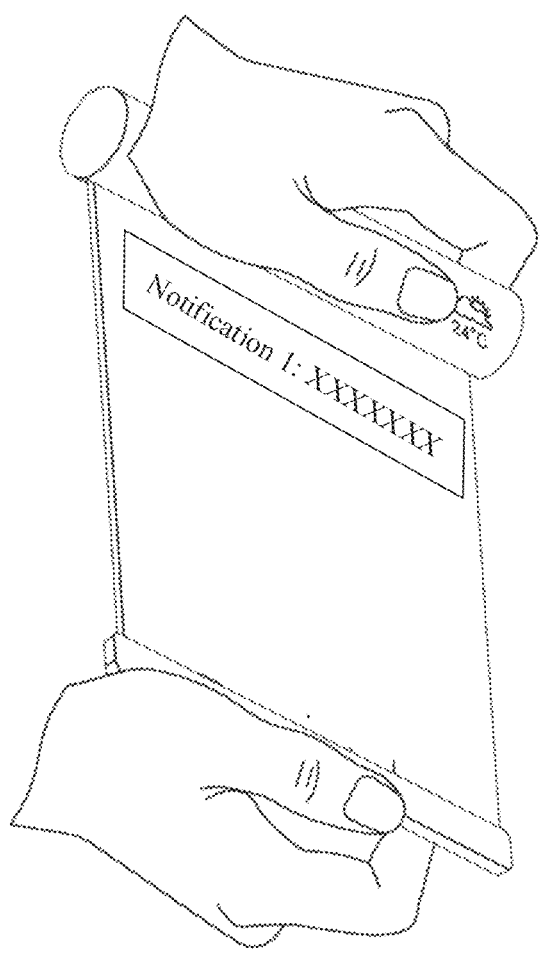

When the rollable touchscreen rolled into a housing is stretched to be fully unfolded, the processor 110 controls the message in the notification bar to be displayed on an edge of a top of an unfolded touchscreen. The top is far from a horizontal plane. For example, as shown in FIG. 10c, it is assumed that there is one notification message in the notification bar, and the user performs the up-down unfolding operation on the fully rolled mobile phone (refer to FIG. 10a), to unfold the mobile phone to a state shown in FIG. 10c. The processor 110 controls the notification message to be horizontally displayed on a notification bar of the rollable touchscreen, that is, displayed on the edge of the top of the unfolded touchscreen.

In a possible embodiment, when a quantity of messages exceeds one, a message displayed on the edge of the top of the unfolded rollable touchscreen may be a new message closest to a current moment, and other messages are arranged and displayed from the edge of the top to a bottom in descending order of receiving time. The bottom is close to the horizontal plane. Alternatively, other messages are arranged and displayed in the notification bar in descending order of receiving time.

Figure 11:
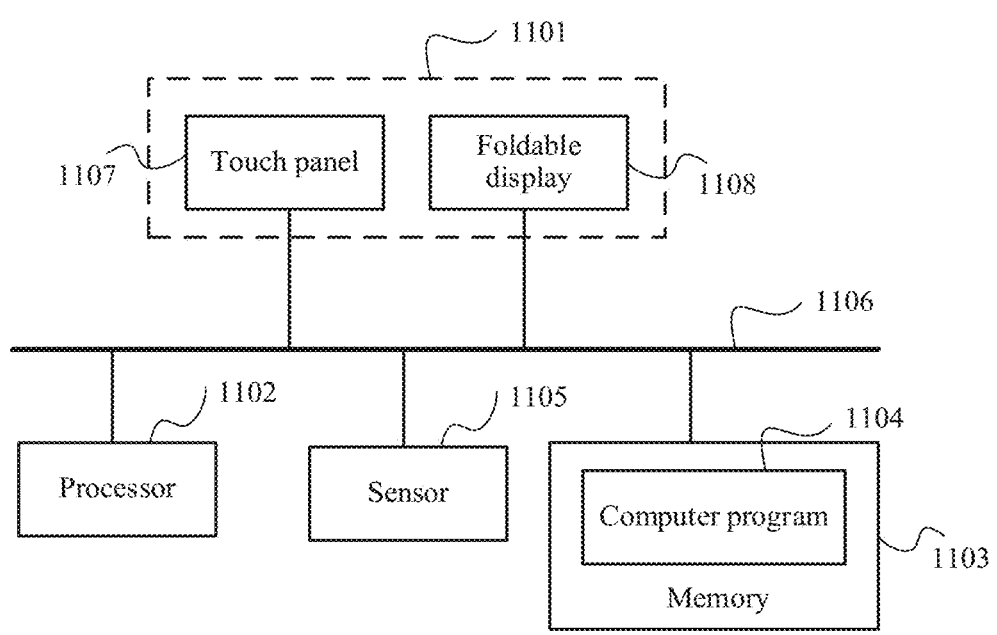
FIG. 11 is a schematic diagram of a structure of another electronic device according to an embodiment of this application.

In some other embodiments of this application, an embodiment of this application discloses an electronic device. As shown in FIG. 11, the electronic device may include a foldable touchscreen 1101, where the foldable touchscreen 1101 includes a touch panel 1107 and a foldable display 1108; one or more processors 1102; a memory 1103; one or more applications not shown); one or more computer programs 1104; and a sensor 1105. The foregoing components may be connected through one or more communications buses 1106. The one or more computer programs 1104 are stored in the memory 1103 and are configured to be executed by the one or more processors 1102. The one or more computer programs 1104 include instructions, and the instructions may be used to perform steps in the corresponding embodiments in FIG. 6.

An embodiment of this application further provides a computer storage medium. The computer storage medium stores computer instructions, and when the computer instructions are run on an electronic device, the electronic device is enabled to perform the foregoing related method steps, to implement the touchscreen display method in the foregoing embodiments.

An embodiment of this application further provides a computer program product. When the computer program product runs on a computer, the computer is enabled to perform the foregoing related steps, to implement the touchscreen display method in the foregoing embodiments.

In addition, an embodiment of this application further provides an apparatus. The apparatus may be specifically a chip, a component, or a module. The apparatus may include a processor and a memory that are connected to each other. The memory is configured to store computer-executable instructions. When the apparatus runs, the processor may execute the computer-executable instructions stored in the memory, to enable the chip to perform the touchscreen display method in the foregoing method embodiments.

The electronic device, the computer storage medium, the computer program product, or the chip provided in the embodiment of this application is configured to perform the corresponding methods provided above. Therefore, for beneficial effects that can be achieved, refer to the beneficial effects of the corresponding methods provided above. Details are not described herein again.

Based on descriptions about the foregoing implementations, a person skilled in the art may understand that, for a purpose of convenient and brief description, division into the foregoing function modules is used as an example for illustration. In actual application, the foregoing functions may be allocated to different modules and implemented based on a requirement. In other words, an inner structure of an apparatus is divided into different function modules to implement all or some of the functions described above.

In the several embodiments provided in this application, it should be understood that the disclosed apparatus and method may be implemented in another manner. For example, the described apparatus embodiment is merely an example. For example, the division into the modules or units is merely logical function division and may be other division in an actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may be one or more physical units, may be located in one place, or may be distributed at different places. Some or all of the units may be selected based on actual requirements to achieve the objectives of the solutions in the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions in the embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip or the like) or a processor (processor) to perform all or some of the steps of the methods described in the embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A touchscreen display method implemented by an electronic device having a foldable touchscreen comprising a first screen, a bendable area, and a second screen, wherein the first screen is foldable with the second screen using the bendable area, and wherein the touchscreen display method comprises:
   receiving a first operation of a user, wherein the first operation is a folding operation performed on the foldable touchscreen or an unfolding operation performed on the foldable touchscreen;
   obtaining, responsive to the first operation, status data from a sensor of the electronic device, wherein the status data comprises a first included angle between the first screen and the second screen;
   controlling, based on the first included angle, a display location, on the foldable touchscreen, of a message in a notification bar;
   controlling, when the foldable touchscreen switches from a fully folded state to a fully unfolded state, the display location to gradually move from an edge of a bottom of the second screen to an edge of a top of the first screen; and
   controlling, when the foldable touchscreen switches from the fully unfolded state to the fully folded state, the display location to gradually move from the edge of the top of the first screen to the edge of the bottom of the second screen.

2. The touchscreen display method of claim 1, wherein when the foldable touchscreen is in a portrait state, the touchscreen display method further comprises:
   controlling, when a difference between the first included angle and zero degrees is less than or equal to a first angle threshold, the message in the notification bar to be displayed on an edge of a bottom of the second screen, wherein a second included angle between the second screen and a horizontal plane is minimum, and wherein the bottom of the second screen is far from the bendable area;
   controlling, when an absolute value of a difference between the first included angle and 90 degrees is less than or equal to a second angle threshold, the message in the notification bar to be displayed on an edge of a top of the second screen, wherein the top of the second screen is adjacent to the bendable area; or
   controlling, when a difference between 180 degrees and the first included angle is less than or equal to a third angle threshold, the message in the notification bar to be displayed on an edge of a top of the first screen, wherein the top of the first screen is far from the bendable area.

3. The touchscreen display method of claim 1, wherein when the foldable touchscreen is in a landscape state, the touchscreen display method further comprises:
   controlling, when a difference between the first included angle and zero degrees is less than or equal to a first angle threshold, the message in the notification bar to be displayed on an edge of a bottom of the second screen that is on a right side, wherein the bottom of the second screen is far from the bendable area, and wherein a display direction of the message in the notification bar is parallel to the bottom;
   controlling, when an absolute value of a difference between the first included angle and 90 degrees is less than or equal to a second angle threshold, the message in the notification bar to be displayed on an edge of an upper side of the second screen that is on the right side, wherein the upper side of the second screen is far from a horizontal plane, and wherein the display direction is parallel to the horizontal plane; or
   controlling, when a difference between 180 degrees and the first included angle is less than or equal to a third angle threshold, the message in the notification bar to be displayed on an edge of an upper side of a large screen including the first screen and the second screen, wherein the upper side of the large screen is far from a ground, and wherein the display direction is parallel to a horizon plane.

4. The touchscreen display method of claim 1, wherein the method further comprises:
   switching the foldable touchscreen from a fully folded state to a fully unfolded portrait state; and
   switching the foldable touchscreen from the fully unfolded portrait state to the fully folded state.

5. The touchscreen display method of claim 4, wherein the first operation comprises unfolding the foldable touchscreen from the fully folded state to the fully unfolded state.

6. The touchscreen display method of claim 4, wherein the first operation comprises folding the foldable touchscreen from the fully unfolded state to the fully folded state.

7. The touchscreen display method of claim 1, wherein the method further comprises:
   switching the foldable touchscreen from a fully folded state to a fully unfolded landscape state; and
   switching the foldable touchscreen from the fully unfolded landscape state to the fully folded state.

8. An electronic device, comprising:
   a sensor;
   a foldable touchscreen comprising a first screen, a bendable area, and a second screen, wherein the first screen is configured to be folded with the second screen using the bendable area;

a memory configured to store one or more computer programs; and a processor coupled to the sensor, the foldable touchscreen, and the memory, and configured to execute the one or more computer programs to cause the electronic device to:
- receive a first operation of a user, wherein the first operation is a folding operation performed on the foldable touchscreen or an unfolding operation performed on the foldable touchscreen;
- obtain, responsive to the first operation, status data from the sensor, wherein the status data comprises a first included angle between the first screen and the second screen;
- control, based on the first included angle, a display location, on the foldable touchscreen, of a message in a notification bar;
- control, when the foldable touchscreen switches from a fully folded state to a fully unfolded state, the display location to gradually move from an edge of a bottom of the second screen to an edge of a top of the first screen; and
- control, when the foldable touchscreen switches from the fully unfolded state to the fully folded state, the display location to gradually move from the edge of the top of the first screen to the edge of the bottom of the second screen.

9. The electronic device of claim 8, wherein when the foldable touchscreen is in a portrait state, the processor is configured to execute the one or more computer programs to further cause the electronic device to:
- control, when a difference between the first included angle and zero degrees is less than or equal to a first angle threshold, the message in the notification bar to be displayed on an edge of a bottom of the second screen, wherein a second included angle between the second screen and a horizontal plane is minimum, and wherein the bottom of the second screen is far from the bendable area; or
- control, when an absolute value of a difference between the first included angle and 90 degrees is less than or equal to a second angle threshold, the message in the notification bar to be displayed on an edge of a top of the second screen, wherein the top of the second screen is adjacent to the bendable area; or
- control, when a difference between 180 degrees and the first included angle is less than or equal to a third angle threshold, the message in the notification bar to be displayed on an edge of a top of the first screen, wherein the top of the first screen is far from the bendable area.

10. The electronic device of claim 8, wherein when the foldable touchscreen is in a landscape state, the processor is configured to execute the one or more computer programs stored to cause the electronic device to:
- control, when a difference between the first included angle and 0 degrees is less than or equal to a first angle threshold, the message in the notification bar to be displayed on an edge of a bottom of the second screen that is on a right side, wherein the bottom of the second screen is far from the bendable area, and wherein a display direction of the message in the notification bar is parallel to the bottom; or
- control, when an absolute value of a difference between the first included angle and 90 degrees is less than or equal to a second angle threshold, the message in the notification bar to be displayed on an edge of an upper side of the second screen that is on the right side, wherein the upper side of the second screen is far from a horizontal plane, and wherein the display direction is parallel to the horizontal plane; or
- control, when a difference between 180 degrees and the first included angle is less than or equal to a third angle threshold, the message in the notification bar to be displayed on an edge of an upper side of a large screen including the first screen and the second screen, wherein the upper side of the large screen is far from the horizontal plane, and wherein the display direction of the message in the notification bar is parallel to a horizon plane.

11. The electronic device of claim 8, wherein the processor is configured to execute the one or more computer programs to cause the electronic device to:
- switch the foldable touchscreen from a fully folded state to a fully unfolded portrait state; and
- switch the foldable touchscreen from the fully unfolded portrait state to the fully folded state.

12. The electronic device of claim 11, wherein the first operation comprises unfolding the foldable touchscreen from the fully folded state to the fully unfolded state.

13. The electronic device of claim 11, wherein the first operation comprises folding the foldable touchscreen from the fully unfolded state to the fully folded state.

14. The electronic device of claim 8, wherein the processor is configured to execute the one or more computer programs to cause the electronic device to:
- switch the foldable touchscreen from a fully folded state to a fully unfolded landscape state; and
- switch the foldable touchscreen switches from the fully unfolded landscape state to the fully folded state.

15. A computer program product comprising instructions that are stored on a non-transitory computer-readable medium and that, when executed by a processor, cause an electronic device to:
- receive a first operation of a user, wherein the first operation is a folding operation performed on a foldable touchscreen of the electronic device or an unfolding operation performed on the foldable touchscreen, wherein the foldable touchscreen comprises a first screen, a bendable area, and a second screen, wherein the first screen is foldable with the second screen using the bendable area;
- obtain, responsive to the first operation, status data from a sensor of the electronic device, wherein the status data comprises a first included angle between the first screen and the second screen;
- control, based on the first included angle, a display location, on the foldable touchscreen, of a message in a notification bar;
- control, when the foldable touchscreen switches from a fully folded state to a fully unfolded state, the display location to gradually move from an edge of a bottom of the second screen to an edge of a top of the first screen; and
- control, when the foldable touchscreen switches from the fully unfolded state to the fully folded state, the display location to gradually move from the edge of the top of the first screen to the edge of the bottom of the second screen.

16. The computer program product of claim 15, wherein when the foldable touchscreen is in a portrait state, the instructions, when executed by the processor, further cause the electronic device to:

control, when a difference between the first included angle and zero degrees is less than or equal to a first angle threshold, the message in the notification bar to be displayed on an edge of a bottom of the second screen, wherein a second included angle between the second screen and a horizontal plane is minimum, and wherein the bottom of the second screen is far from the bendable area; or control, when an absolute value of a difference between the first included angle and 90 degrees is less than or equal to a second angle threshold, the message in the notification bar to be displayed on an edge of a top of the second screen, wherein the top of the second screen is adjacent to the bendable area; or control, when a difference between 180 degrees and the first included angle is less than or equal to a third angle threshold, the message in the notification bar to be displayed on an edge of a top of the first screen, wherein the top of the first screen is far from the bendable area.

17. The computer program product of claim 15, wherein when the foldable touchscreen is in a landscape state, the instructions, when executed by the processor, further cause the electronic device to:

control, when a difference between the first included angle and zero degrees is less than or equal to a first angle threshold, the message in the notification bar to be displayed on an edge of a bottom of the second screen that is on a right side, wherein the bottom of the second screen is far from the bendable area, and wherein a display direction of the message in the notification bar is parallel to the bottom; or control, when an absolute value of a difference between the included angle and 90 degrees is less than or equal to a second angle threshold, the message in the notification bar to be displayed on an edge of an upper side of the second screen that is on the right side, wherein the upper side of the second screen is far from a horizontal plane, and wherein the display direction is parallel to the horizontal plane; or control, when a difference between 180 degrees and the included angle is less than or equal to a third angle threshold, the message in the notification bar to be displayed on an edge of an upper side of a large screen including the first screen and the second screen, wherein the upper side of the large screen is far from a ground, and wherein the display direction is parallel to a horizon plane.

18. The computer program product of claim 15, wherein, the instructions, when executed by the processor, further cause the electronic device to:

switch the foldable touchscreen from a fully folded state to a fully unfolded portrait state; or switch the foldable touchscreen from the fully unfolded portrait state to the fully folded state.

19. The computer program product of claim 15, wherein the instructions, when executed by the processor, further cause the electronic device to:

switch the foldable touchscreen from a fully folded state to a fully unfolded landscape state; or switch the foldable touchscreen from a fully unfolded landscape state to a fully folded state.

20. The computer program product of claim 19, wherein the first operation comprises folding the foldable touchscreen from the fully unfolded state to the fully folded state.

* * * * *